US007908187B2

(12) United States Patent
Reddy et al.

(10) Patent No.: US 7,908,187 B2
(45) Date of Patent: Mar. 15, 2011

(54) SUPPORTING CHARGEABLE SUBCONTRACTING WHEN OUTSOURCING MANUFACTURING OF AN ASSEMBLED UNIT WHILE SUPPLYING COMPONENTS

(75) Inventors: Kachireddy Venkata Sesha Muralidhar Reddy, Hyderabad (IN); Rajesh Krishnan, Newark, CA (US); Frederic Dubois, San Francisco, CA (US); Satoru Kengaku, Kasugai (JP); Vincent Shu-Lai Chu, Coronado, CA (US); Prabha Seshadri, San Jose, CA (US); Neelam Soni, Hyderabad (IN); Vamshi Krishna Mutyala, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 696 days.

(21) Appl. No.: 11/861,318

(22) Filed: Sep. 26, 2007

(65) Prior Publication Data

US 2009/0083166 A1    Mar. 26, 2009

(51) Int. Cl.
*A01K 5/02*    (2006.01)
*G06F 17/50*   (2006.01)
*G06Q 10/00*   (2006.01)
*G06Q 40/00*   (2006.01)
*G07F 19/00*   (2006.01)
*H04M 15/00*   (2006.01)

(52) U.S. Cl. ............... 705/29; 705/28; 705/34; 705/40
(58) Field of Classification Search .................. None
See application file for complete search history.

(56) References Cited

OTHER PUBLICATIONS

Oracle Work in Process User's Guide, Release 11i, vol. 1, Feb. 2002.*
"Oracle Work In Process", Copyright 2006, http://www.oracle.com/applications/manufacturing/work-in-process-data-sheet.pdf, Downloaded circa: May 7, 2007, pp. 1 to 6.
"Oracle Previews New Release of Oracle® E-Business Suite at Oracle OpenWorld 2006", http:www.oracle.com/corporate/press/2006_oct/openworldsf06-30.html, Dated Oct. 25, 2006.

\* cited by examiner

*Primary Examiner* — F. Ryan Zeender
*Assistant Examiner* — Hajime Rojas
(74) *Attorney, Agent, or Firm* — Narendra Reddy Thappeta

(57) ABSTRACT

A digital processing system supporting management of purchase orders according to chargeable subcontracting model in an outsourcing organization. In one embodiment, when a user provides an order for a desired quantity of an assembly type from an external organization, the digital processing system automatically raises a sales order, as originating from the external organization, corresponding to each of a set of components required for manufacturing the assembly type. On receiving a receipt indication indicating the successful delivery of the order, the digital processing system calculates a net payable amount to be paid to the external organization. Additional aspects of the invention facilitate setting up of chargeable contracting model with simulated (within the digital processing system) external organizations, planning of purchase orders, etc.

21 Claims, 32 Drawing Sheets

FIG. 5A

Organization

521 — Name [GBL TP3 Organization]  Type [Third Party]

Dates
From [26-OCT-2005]  To [ ]

523 — Location [TP3 Location]  Internal or External [External]
Location Address [Japan......Japan]
Internal Address [ ]

Classifications
Name                    Enabled
Inventory Organization    ✓
                         [ ]
                         [ ]
                                    (Others)
525 —

Role Assignment
Customer      [GBL_TP03 (7371)]
Customer Site [Ship (SHIP TO)]
Supplier      [GBL_TP03]
Supplier Site [OSA]
526 —

Parameters
✓ Manufacturing Partner Organization
Costing Organization [GBL_TP3 Organization]
527 —

Costing Method [Standard]
Transfer to GL [No] ▶

529 — (Save) (Cancel) (Clear)

*FIG. 5B*

Master Item (VI)

531 — Organization | VI | Vision Operations
532 — Item | OSA-A
533 — Description | Outsourced Assembly-A 535 — Unit of Measure
- Primary | Each
- Tracking | Primary
- Pricing | Primary
- Secondary
- Defaulting Conversions
○ Standard
○ Item specific
● Both 534 — Display Attributes
○ Master  ○ Org  ● All 536 —
User Item Type | Purchased item
Item Status | Active
Long Description 537 — Organization Assignment

| Org | Name | Primary | Tracking | Pricing | Assigned |
|---|---|---|---|---|---|
| ■ OE3 | GBL OE3 Organization | Each | Primary | Primary | ✓ |
| ☐ TP3 | GBL TP3 Organization | Each | Primary | Primary | ✓ |
| ☐ VI | Vision Operations | Each | Primary | Primary | ✓ |
| ☐ AD5 | AD5 | Each | Primary | Primary | ☐ |
| ☐ AD6 | AD6 | Each | Primary | Primary | ☐ |

538A, 538B ( Org Attributes )  ( Assign All )

Organization Item (OE3) — 540

Organization: OE3 | GBL OE3 Organization
Item: OSA-A
Description: Outsourced Assembly - A

Display Attributes — 544
○ Master  ● Org  ○ All

Purchasing — 542

✓ Purchased  ✓ Purchasable  ☐ Use Approved Supplier
✓ Allow Description Update  ✓ Outsourced Assembly

General Planning — 545

Inventory Planning Method: Not Planned ▶  Planner: J. Smith
Subcontracting Component: ▶  Make or Buy: Buy ▶

MPS/MRP Planning — 546

Planning Time Fence: User-Defined ▶  Release Time Fence: ▶
Demand Time Fence: ▶  Substitution Window: ▶

549 — ( Save )  ( Cancel )  ( Clear )

*FIG. 5D*

Organization Item (TP3)

Organization: TP3 | GBL TP3 Organization
Item: OSA-A
Description: Outsourced Assembly - A Display Attributes
○ Master  ● Org  ○ All

Purchasing — 552

✓ Purchased  ✓ Purchasable
✓ Allow Description Update

☐ Use Approved Supplier
✓ Outsourced Assembly

General Planning — 556

Inventory Planning Method: Not Planned ▶
Subcontracting Component: ▶

Planner: J. Smith
Make or Buy: Make ▶

MPS/MRP Planning — 558

Planning Time Fence: User-Defined ▶
Demand Time Fence: ▶

Release Time Fence: Do Not Release Auto or Manual ▶
Substitution Window: ▶

(Save) (Cancel) (Clear)

*FIG. 5E*

Organization Item (OE3)

Organization: OE3 | GBL OE3 Organization
Item: Comp-B
Description: Subcontracting Component - B Display Attributes
○ Master  ● Org  ○ All

Purchasing

☑ Purchased — ☑ Purchasable — ☐ Use Approved Supplier
☑ Allow Description Update — ☐ Outsourced Assembly

General Planning

Inventory Planning Method: Not Planned ▶ — Planner: J. Smith
Subcontracting Component: Synchronized ▶ — Make or Buy: Buy ▶

MPS/MRP Planning

Planning Time Fence: User-Defined ▶ — Release Time Fence ▶
Demand Time Fence ▶ — Substitution Window ▶

( Save )  ( Cancel )  ( Clear )

Bills Of Material (OE3)

Item: OSA-A  Description: Outsourced Assembly-A  UOM: Ea

Display: Future and Current  Revision: 28-Aug-2006 20:30:00

| Item Seq | Op Seq | Component | Item Description | UOM | Basis | Quantity |
|---|---|---|---|---|---|---|
| 10 | 1 | Comp-B | Subcontracting Component-B | Ea | Item | 2 |
| 20 | 1 | Comp-C | Subcontracting Component-C | Ea | Item | 1 |

(Bill Details)  (Revision)

*FIG. 5G*

Transaction Types (Receivables, Vision Operations) — 640

Operating Unit: Vision Operations  
Legal Entity: Vision Operations  
Name: Chargeable Subcontra  
Description: Chargeable Subcontracting  
Class: Invoice  
☑ Post to GL  
Transaction Status: Open

Accounts — Deposit

Receivable Account: 01-000-1221-0000-000  Freight Account: Open  
Revenue Account: 01-000-2557-0000-000  Clearing Account:  
Unbilled Receivable Acct:  Unearned Rev. Acct:  
Tax Account:  
GL Account Description: Operations-No Department-Subcontracting Revenue-No Sub Account-No Product (Save) (Cancel) — 649

Order Type

| | | | |
|---|---|---|---|
| Operating Unit | Vision Operations | Transaction Type | Chargeable Subcontracting |
| Description | Chargeable Subcontracting | Sales Document Type | Sales Order |
| Order Category | Mixed | Transaction Type Code | ORDER |
| Fulfillment Flow | Order Flow - Generic | Negotiation Flow | |
| ✓ Retain Document Number | | | |

652

Source

| | |
|---|---|
| Invoice Source | Chargeable Subcontra ▶ |
| Non Delivery Invoice Source | |

657

Receive

| | | | |
|---|---|---|---|
| Receivables Transaction Type | Chargeable Subcontra | Tax Event | |
| Cost of Goods Sold Account | | Currency | |
| Conversion Type | CS | | |

658

( Approvals )

659 ( Save ) ( Cancel )

Shipping Networks (OE3)

Organization: OE3    GBL_OE3 Organization

Scope: From or To Organization    ▶    (Find)

Shipping Networks

| From | To | Transfer Type | FOB | Routing | Chargeable Subcontracting Enabled | Default Order Type | Variance |
|------|-----|---------------|-----|---------|-----------------------------------|--------------------|----------|
| OE3  | TP3 | Intransit     | Receipt | Direct | ✓ | Changeable Subcontracting | 01-000-5215-0000-000 |
|      |     |               |     |         | ☐ |                    |          |
|      |     |               |     |         | ☐ |                    |          |
|      |     |               |     |         | ☐ |                    |          |

(New) (Open)

| Components | Consumption Adjustment |

Search

Type [Subcontracting Order ▶] — 751
     [6375] — 752

Outsourced Assembly [ ]

Operating Unit [Vision Operations]

Subcontracting Organization [GBL OE3 Organization]

( Clear )  ( Go ) — 754

| Order No | Line | Shipment | Release | Outsourced Assembly | Manufacturing Partner | Manufacturing Partner Site | Component | Item Description | Consumption Estimated | Consumption Actual | Consumption Amount | Consumption UOM | Consumption Reason |
|---|---|---|---|---|---|---|---|---|---|---|---|---|---|
| 6375 | 1 | 1 | | OSA-A | GBL_TP03 | GBL_TP03 | Comp-B | Subcontracting Component-B | 200 | 200 | 5 | Ea | Additional scarp |
| 6375 | 1 | 1 | | OSA-A | GBL_TP03 | GBL_TP03 | Comp-C | Subcontracting Component-C | 100 | 100 | 0 | Ea | |

( Revert ) ( Save ) — 759

Material Transactions (TP3)

Location

| Item | Subinventory | Locator | Supplier | Transaction Date | Transaction ID | Transaction Quantity |
|---|---|---|---|---|---|---|
| Comp-B | STORES | | | 30-Aug-06 07:13:55 | 22296031 | 200 |
| Comp-C | STORES | | | 30-Aug-06 07:13:55 | 22296030 | 100 |
| | | | | | | |
| | | | | | | |
| | | | | | | |

Item Description: Subcontracting Component-B    Date: 30-Aug-06 07:13:55

Primary UOM: Ea    Primary Quantity: 200

Secondary UOM:    Secondary Quantity:

Close 762
764
766

FIG. 7F

Invoice Workbench (Payables, Vision Operations)

| Operating Unit | Customer Taxpayer ID | Type | PO Num | Trading Partner | Supplier Num | Supplier site | Invoice Date | Invoice Num | Invoice |
|---|---|---|---|---|---|---|---|---|---|
| Vision Operations | | Standard | 6375 | GBL_TP03 | 1728385 | OSA | 28-Aug-2006 | ERS-28-Aug | USD |
| | | | | | | | | | |
| | | | | | | | | | |

822
824 ■ □ □

| 1. General | 2. Line | 3. Hold | 4. View Payments | 5. Scheduled Payments | 6. View Prepayment Application |

Summary
- Item: 1,900.00
- Retainage:
- Prepayments Applied:
- Withholding:
- Subtotal: 1,900.00
- Tax:
- Freight:
- Miscellaneous:
- Total: 1,900.00

826

Amount Paid
UDS  0.00

827
828

Status
- Status: Validated
- Accounted: No
- Approval: Not Required
- Holds: 0
- Scheduled Payment Holds: 0

Description
Receipt Invoice automatically created on 28-Aug-06

829

(Corrections) (Match) (All Distributions)

*FIG. 8B*

Netting Agreement

Update Batch: 10044 — 832

| | | |
|---|---|---|
| Operating Unit | Vision Operations | Settlement Date 31-Aug-2006 |
| Batch Number | 10044 | Receivables Amount 1,400.00 USD |
| Batch Name | GBL_TP03 | Payables Amount 1,900.00 USD |
| Batch Status | Selected | Proposed netting Amount 1,400.00 USD |

[ Receivables Transactions ] [ Payables Transactions ]

Search

| | | | |
|---|---|---|---|
| Customer | | Location | |
| Transaction Type | | Transaction Number | [ Go ] |

836

| Rank | Transaction Number | Transaction Type | Customer | Cust. Number | Location | Transaction Date | Transaction Amount | Currency | Open Amount | Reckoning Currency |
|---|---|---|---|---|---|---|---|---|---|---|
| 1 | 62 | Chargeable Subcontracting | | 7371 | 14742 | 30-Aug-2006 | 800.00 | USD | 800.00 | USD |
| 2 | 63 | Chargeable Subcontracting | | 7371 | 14742 | 30-Aug-2006 | 600.00 | USD | 600.00 | USD |
| | | | | | | Total | | | 1,400.00 | |

↑ 837
↑ 838

[ Cancel ] [ Save ] [ Submit ]

*FIG. 8C*

Netting Agreement

Update Batch: 10044

Operating Unit  Vision Operations                         Settlement Date  31-Aug-2006
Batch Number    10044                                     Receivables Amount  1,400.00 USD
Batch Name      GBL_TP03                                  Payables Amount     1,900.00 USD
Batch Status    Selected                                  Proposed netting Amount  1,400.00 USD

| Receivables Transactions | Payables Transactions |
|---|---|

Search

Supplier  [  ]                Site  [  ]
Invoice Type  [  ]            Invoice Number  [  ]                             [ Go ]

| Rank | Invoice Number | Invoice Type | Supplier | Supp. Number | Site | Invoice Date | Invoice Amount | Invoice Currency | Open Amount | Reckoning Currency |
|---|---|---|---|---|---|---|---|---|---|---|
| 1 | ERS-28-Aug-2006-85663 | Standard | GBL_TP03 | 1728385 | OSA | 28-Aug-2006 | 1,900.00 | USD | 1,900.00 | USD |

Total  1,900.00

[ Cancel ]  [ Save ]  [ Submit ]  — 849

846 → (Rank column)
847 → (row 1)

FIG. 8D

Invoice Workbench (Payables, Vision Operations)

| Operating Unit | Customer Taxpayer ID | Type | PO Num | Trading Partner | Supplier Num | Supplier site | Invoice Date | Invoice Num | Invoice |
|---|---|---|---|---|---|---|---|---|---|
| Vision Operations | | Standard | | GBL_TP03 | 1728385 | OSA | 28-Aug-2006 | ERS-28-Aug | USD |
| | | | | | | | | | |
| | | | | | | | | | |

← 854

| 1. General | 2. Line | 3. Hold | 4. View Payments | 5. Scheduled Payments | 6. View Prepayment Application |

Summary

| Item | 1,900.00 |
| Retainage | |
| Prepayments Applied | |
| Withholding | |
| Subtotal | 1,900.00 |
| Tax | |
| Freight | |
| Miscellaneous | |
| Total | 1,900.00 |

Amount Paid

UDS  1,400.00  ← 858

Status

Status: Validated
Accounted: No
Approval: Not Required
Holds: 0
Scheduled Payement Holds: 0

Description

Receipt Invoice automatically created on 28-Aug-06

( Corrections )  ( Match )  ( All Distributions )

*FIG. 8E*

Invoice Workbench (Payables, Vision Operations)

| Operating Unit | Customer Taxpayer ID | Type | PO Num | Trading Partner | Supplier Num | Supplier site | Invoice Date | Invoice Num | Invoice |
|---|---|---|---|---|---|---|---|---|---|
| Vision Operations | | Standard | | GBL_TP03 | 1728385 | OSA | 28-Aug-2006 | ERS-28-Aug | USD |
| | | | | | | | | | |
| | | | | | | | | | |

1. General | 2. Line | 3. Hold | 4. View Payments | 5. Scheduled Payments | 6. View Prepayment Application

Payment

| Due Date | Gross Amount | Currency | Priorty | Method |
|---|---|---|---|---|
| 28-Aug-2006 | 1,900.00 | | 99 | Check |
| | | | | |
| | | | | |

Payment Schedule

Amount Remaining  500.00
Discount Amount Remaining  0.00
Gross Amount  USD  1,900.00

Invoice

Amount Paid  1,400.00

Bank Account

| Number | Name | Date |
|---|---|---|
| | | |
| | | |
| | | |

Invoice Amount  1,900.00
Gross Amount Total  1,900.00

(Split Schedule (G))  (Pay...1)
(Corrections)  (Match)  (All Distributions)

*FIG. 8F*

SUPPORTING CHARGEABLE SUBCONTRACTING WHEN OUTSOURCING MANUFACTURING OF AN ASSEMBLED UNIT WHILE SUPPLYING COMPONENTS

BACKGROUND

1. Technical Field

The present disclosure relates to manufacturing environments and more specifically to supporting chargeable subcontracting when outsourcing manufacturing of an assembled unit from multiple components.

2. Related Art

Assembled units are often manufactured using multiple components. For example, to manufacture a computer system, a manufacturer may use components such as motherboards, hard-disks, display panels, key-boards, etc. The assembled units may represent a final product or an intermediate product used in other assembled units.

Manufacturing of assembled units is often outsourced (by an outsourcing organization) to external organizations while supplying at least some of the components. In addition to assembling (putting together) of the components, the external organization may perform various value additions such as further refinement/modification of the components and/or assembled units, etc.

Chargeable subcontracting refers to a business methodology, in which the outsourcing organization ships the components to an external organizations treating that shipment (the physical movement of commodities/items from a supplier location to a customer location) as a sale, receives the assembled units from external organizations while treating that the shipped components are brought back from the external organization and merely pays an amount reflecting the additional value provided by the external organization in manufacturing the assembled units from the shipped components. Such methodology is often employed in countries such as Japan, for various legal and business reasons.

Outsourcing organizations often places several orders according to chargeable subcontracting mode. These orders can be for different assembly types, and sometimes for different number of units at different time points of the same assembly type. In addition, the orders can be to different external organizations.

It is generally desirable that an outsourcing organization be able to maintain various types of information with respect to such orders.

BRIEF DESCRIPTION OF THE DRAWINGS

Example embodiments of the present invention will be described with reference to the accompanying drawings briefly described below.

FIG. 5A depicts the manner in which a user creates an outsourcing organization as an inventory organization and assigns a supplier role to the organization in one embodiment.

FIG. 5B depicts the manner in which a user creates an external organization (for simulation purposes) as an inventory organization and assigns supplier and customer roles to the organization in one embodiment.

FIG. 5C depicts the manner in which an assembly type is defined and assigned to specific organizations in one embodiment.

Each of FIGS. 5D, 5E and 5F depicts the manner in which a user specifies attributes of a component/assembly type specific to an (outsourcing or external) organization in one embodiment.

FIG. 5G depicts the manner in which a bill of materials (BOM) identifying the component requirements for manufacturing units of an assembly type is created in one embodiment.

Figure 6A:
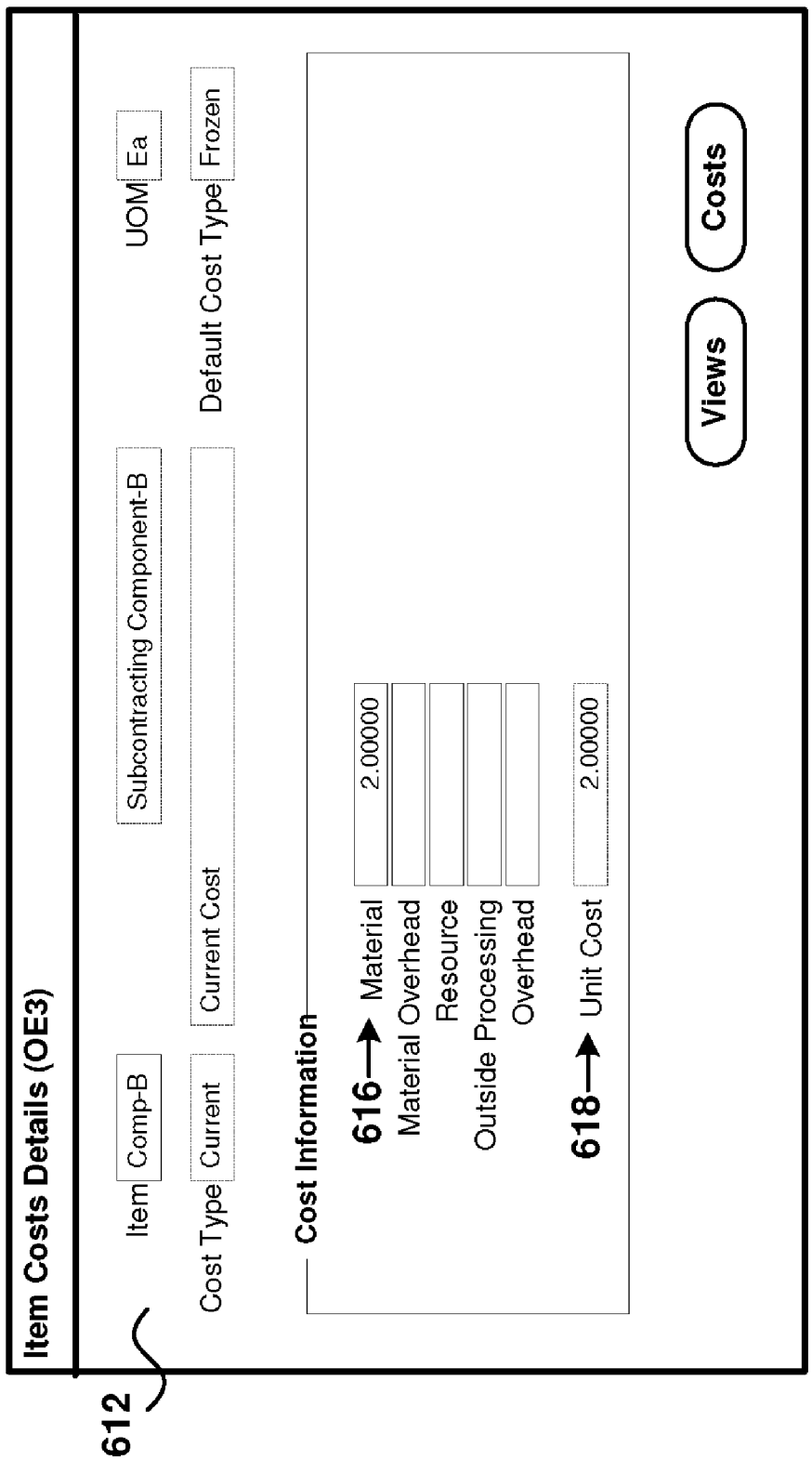
Figure 6B:
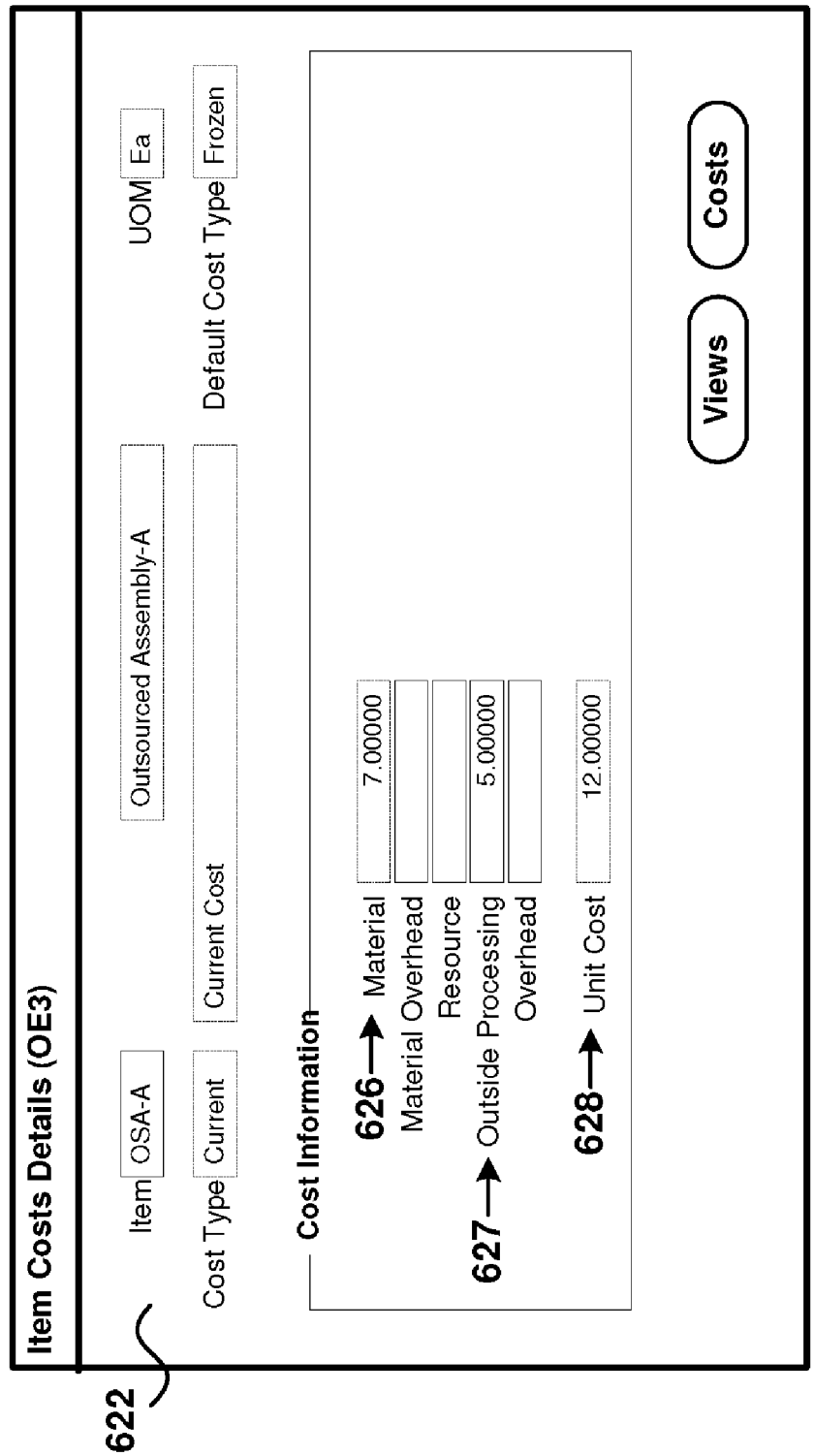
Figure 6C:
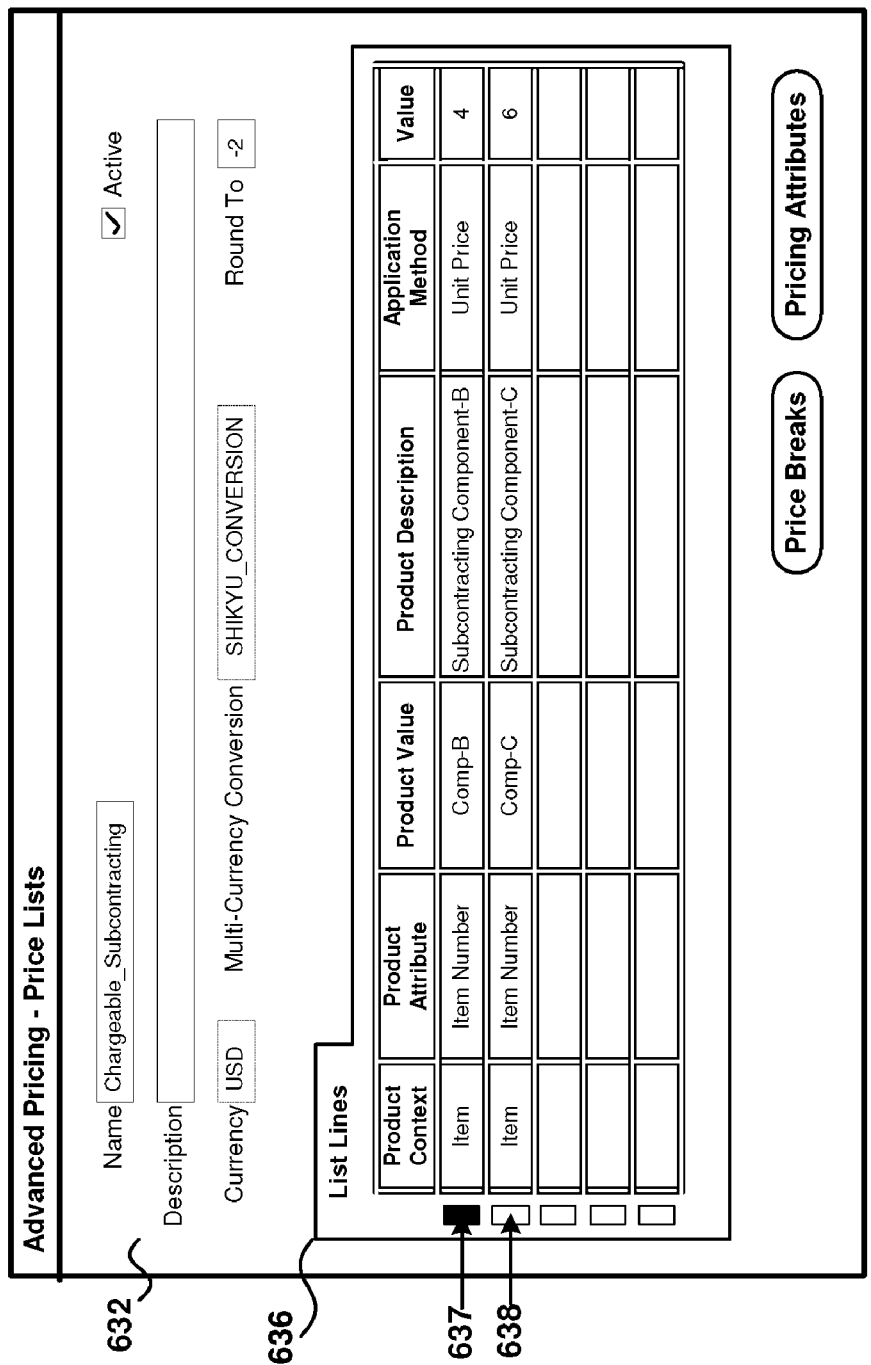

FIGS. 6A-6C together depict the manner in which a user defines cost related information for assembly types and corresponding components in an embodiment.

FIG. 6D depicts the manner in which a new transaction type for supporting chargeable subcontracting model is created in an embodiment.

FIG. 6E depicts the manner in which a new order type is created for orders, which are according to chargeable subcontracting model in one embodiment.

FIG. 6F depicts the manner in which shipping networks between various organizations are defined in one embodiment.

Figure 7A:
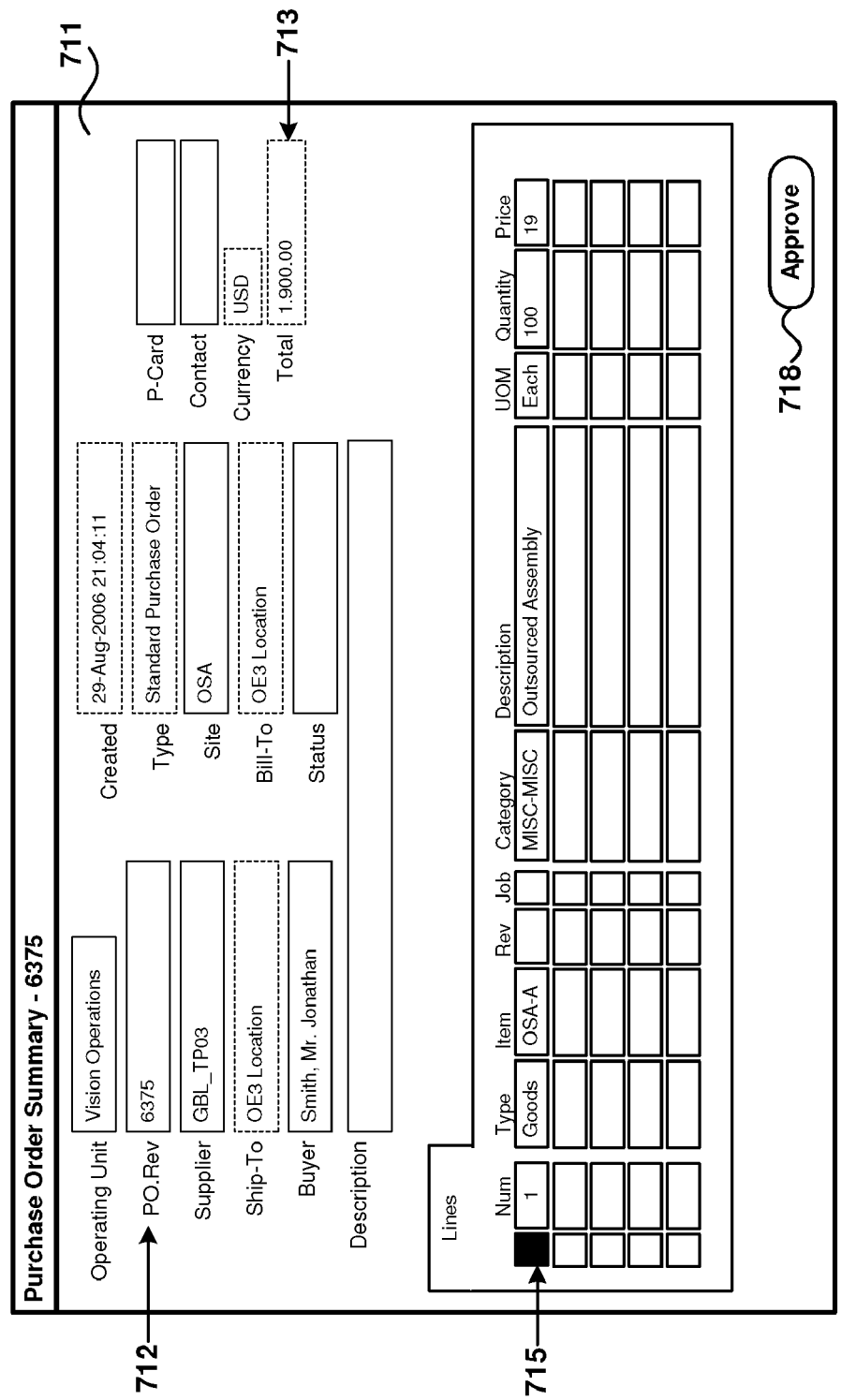

FIG. 7A depicts the manner in which a user generates an order indication, indicating a desired quantity of an assembly type is to be ordered according to chargeable subcontracting model, in an embodiment.

Figure 7B:
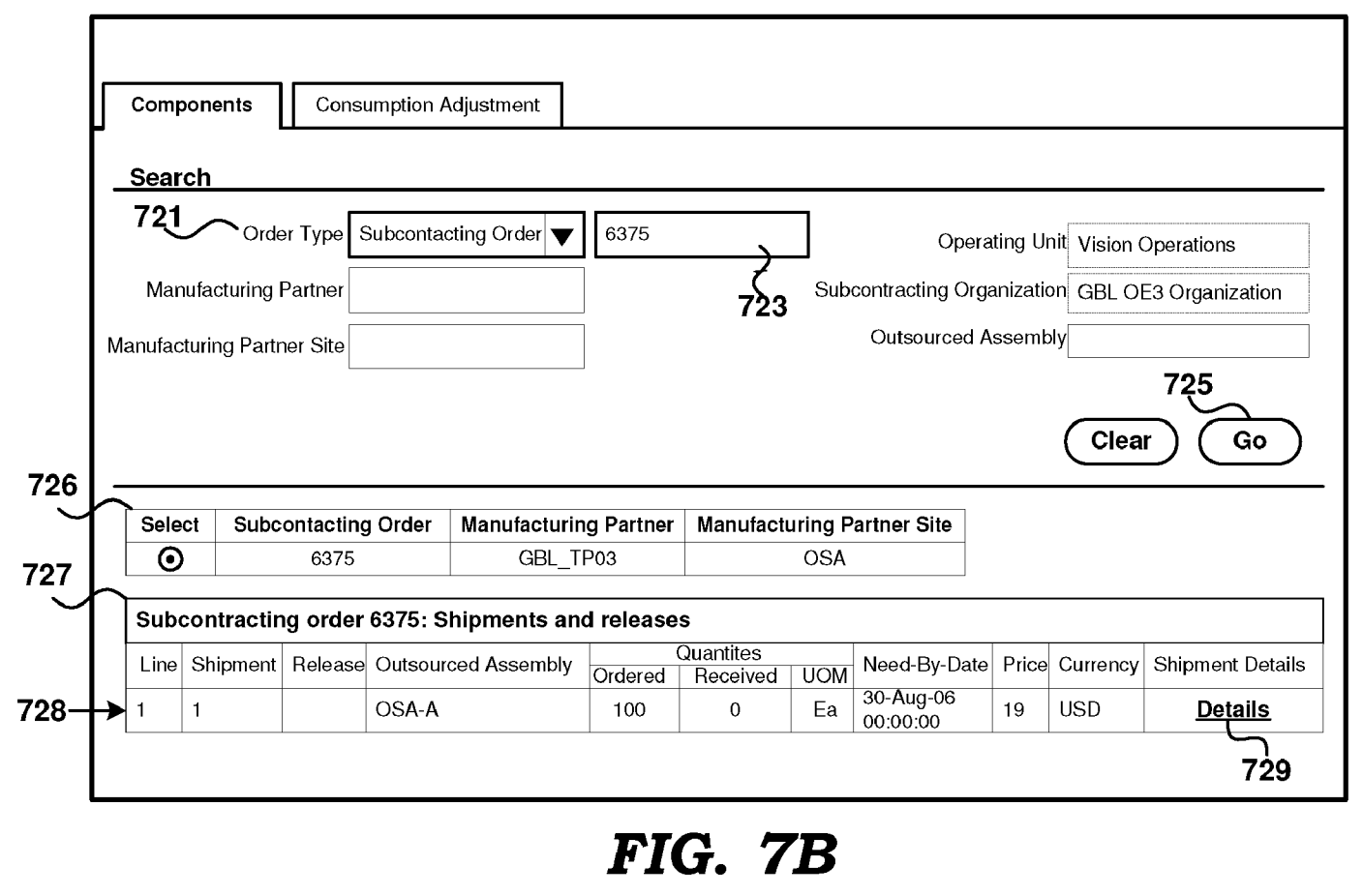

FIG. 7B provides an interface for searching for approved purchase orders in an embodiment.

Figure 7C:
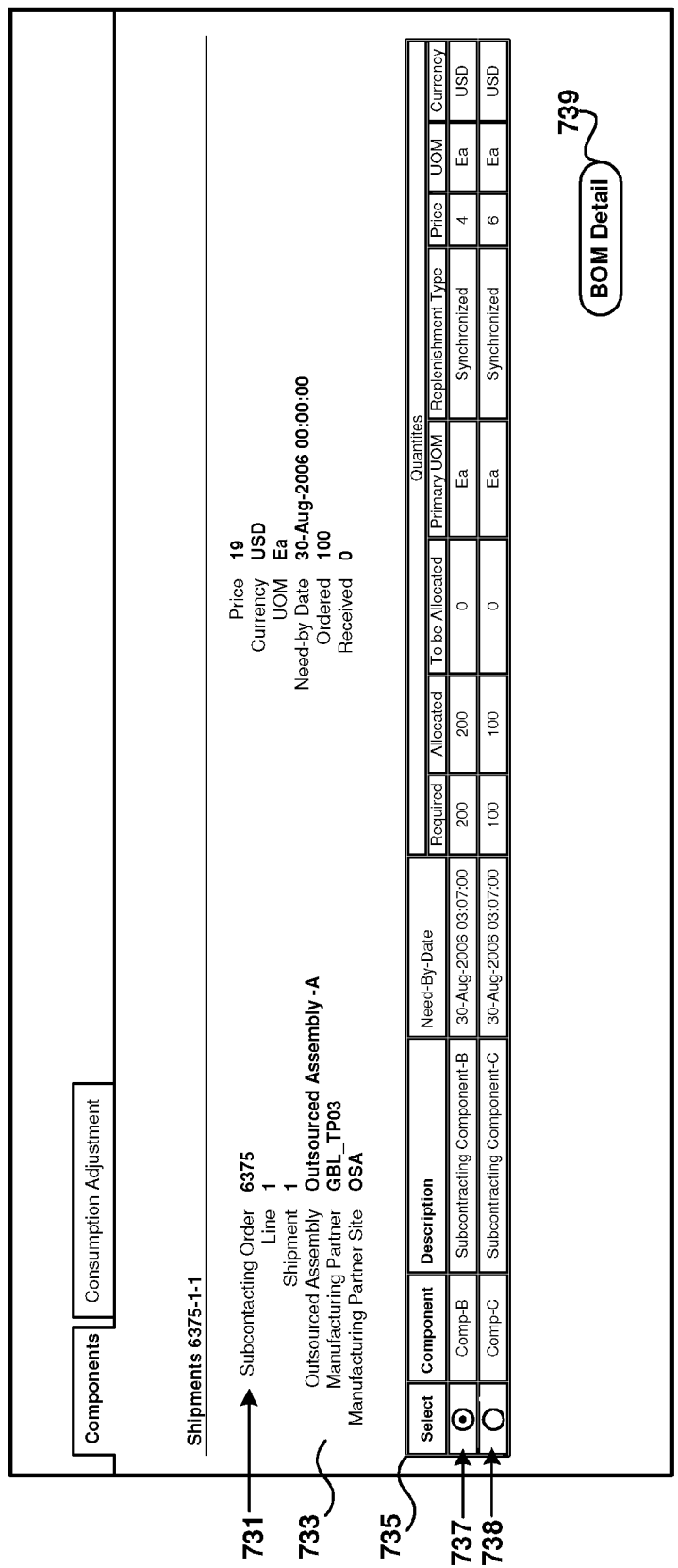

FIG. 7C depicts all the components required for manufacturing a single subcontracted assembly type in a single subcontracting order in the external organization in an embodiment.

Figure 7D:
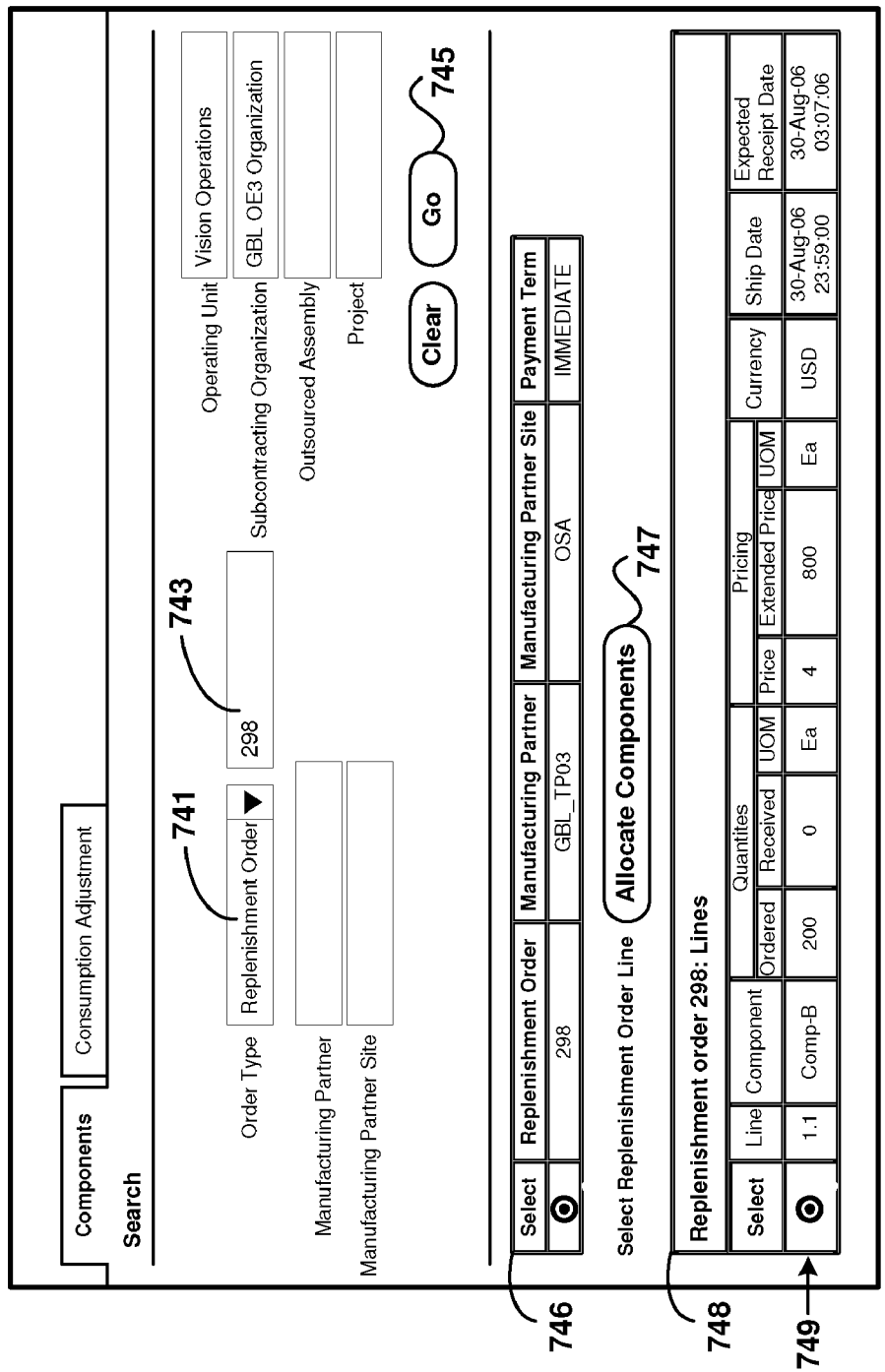

FIG. 7D depicts the details of a single sales order raised as originating from the external organization for a component required for manufacturing a subcontracted assembly type in an embodiment.

FIG. 7E provides an interface using which a user may adjust the number of components actually consumed for manufacturing a single assembly type in an external organization in an embodiment.

FIG. 7F depicts the item transactions at the external organization site indicating that the components required for manufacturing an assembly type have been received in an embodiment.

Figure 7G:
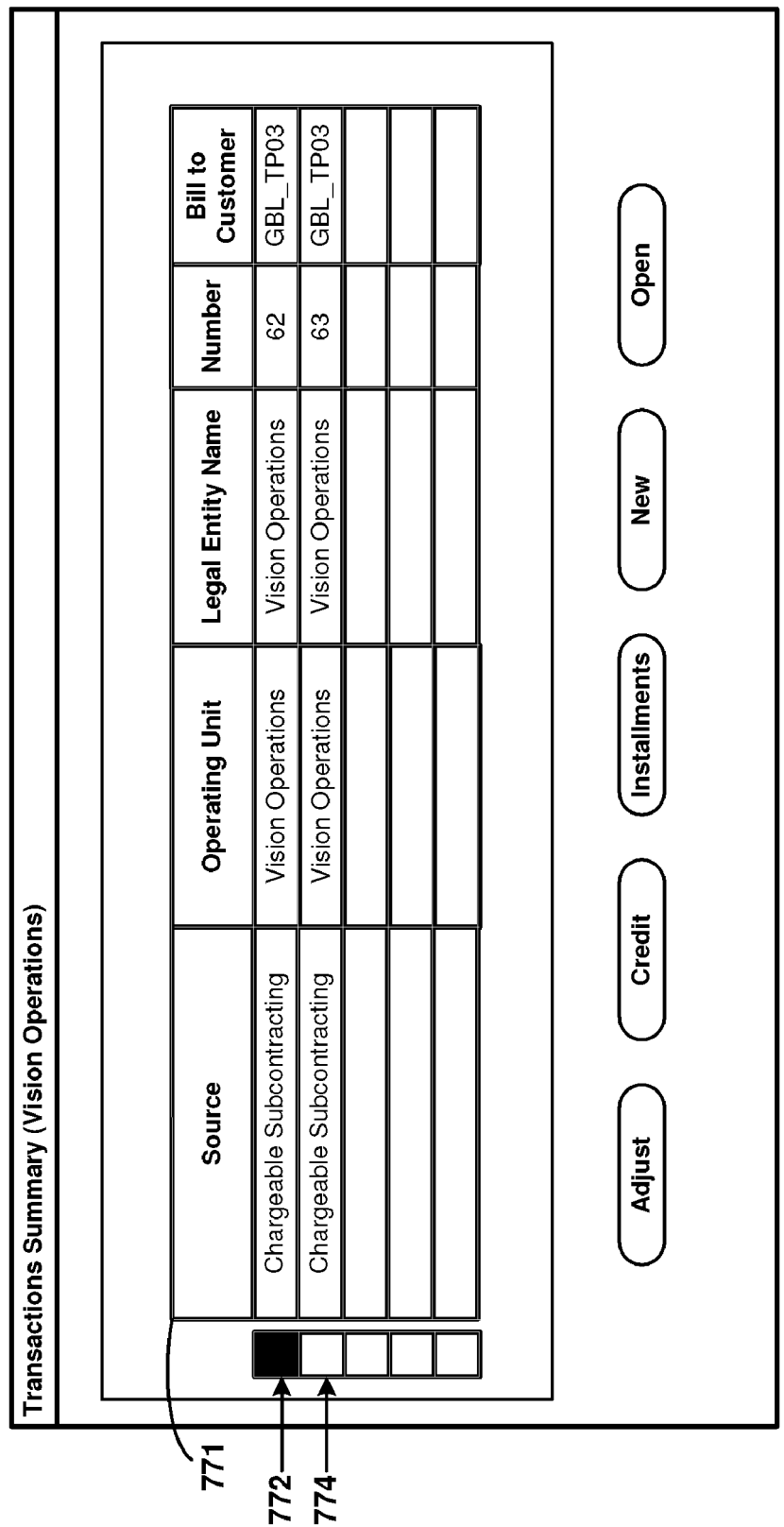

FIG. 7G depicts the account receivable (AR) invoices raised for the number of components shipped to the external organization in an embodiment.

Figure 8A:
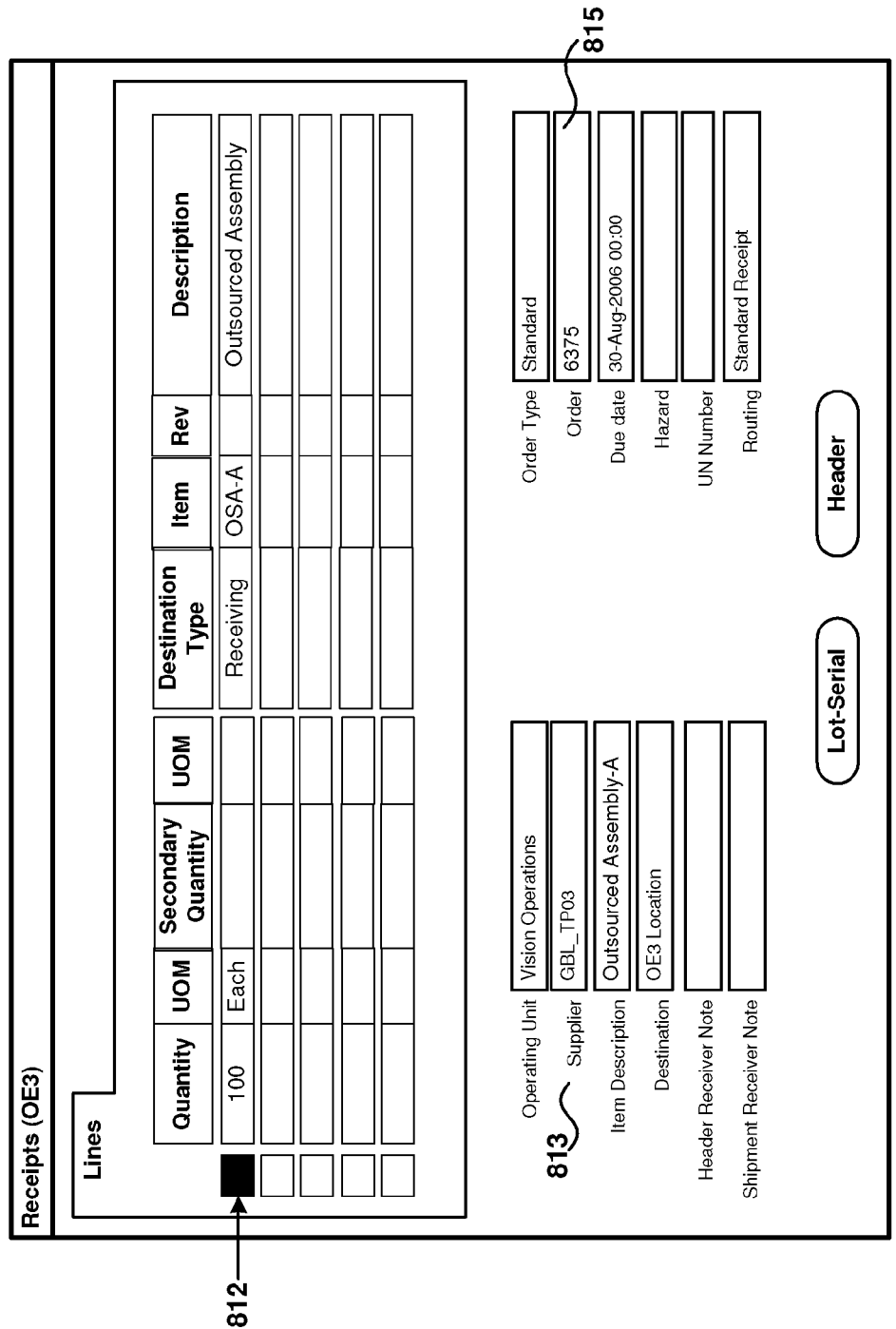

FIG. 8A depicts the manner in which a user specifies receipt of the ordered quantity of an assembly type in an embodiment.

FIG. 8B depicts accounts payable (AP) invoices raised for indicating the deemed price to be paid for the received quantity of an assembly type in an embodiment.

FIGS. 8C-8F together illustrate the manner in which the net payable amount is calculated based on the aggregate payable price and the aggregate receivable price in one embodiment.

Figure 9:
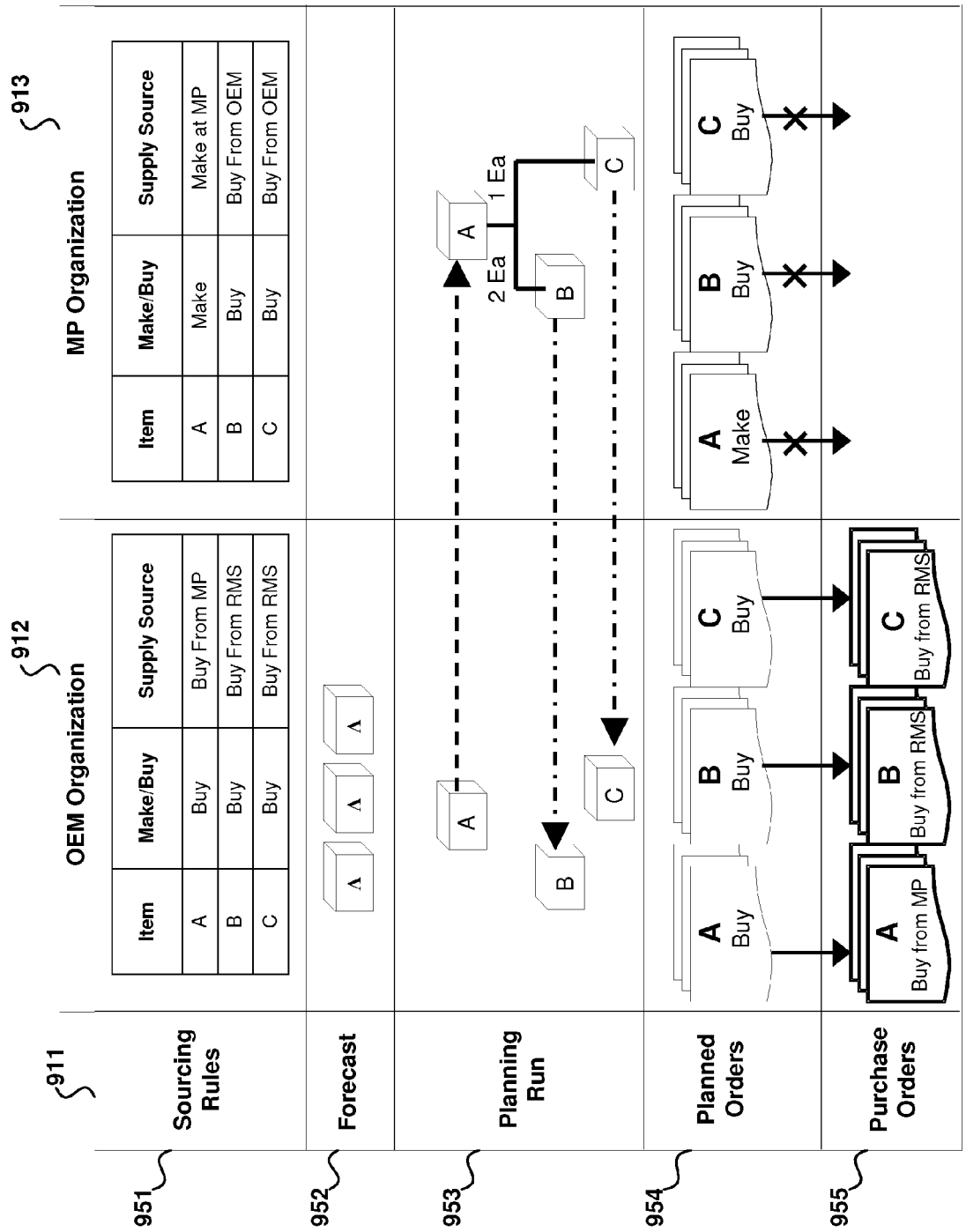

FIG. 9 is a block diagram illustrating the manner in which the orders for components and assembly types can be planned in an embodiment of the present invention.

Figure 10:
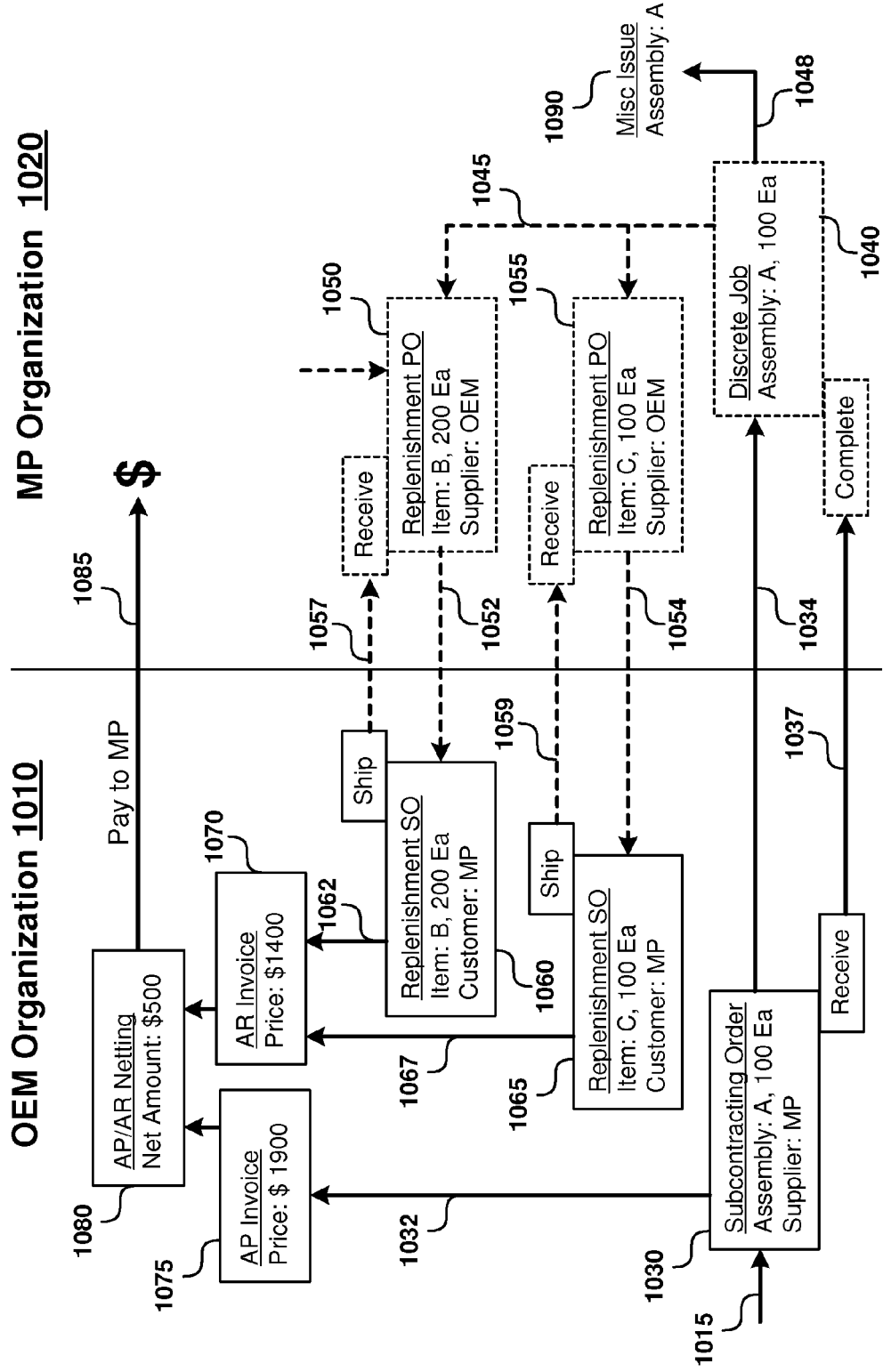

FIG. 10 is a flow diagram summarizing the operations of a digital processing system supporting chargeable subcontracting models in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

A digital processing provided according an aspect of the present invention enables an outsourcing organization to efficiently manage outsourcing of assembled units to an external organization and shipment of components to the external organization according to chargeable subcontracting model. In an embodiment, the digital processing system maintains component information specifying assembly types and a corresponding set of components (and count of each component) required for manufacturing each assembly type.

When a user provides an order for a desired quantity of an assembly type from an external organization, the digital processing system automatically raises a sales order (a physical/electronic document used by a supplier organization to approve, track, and process movement of commodities/items ordered by a customer organization), as originating from the external organization, corresponding to each of a set of components required for manufacturing the assembly type. Such a sales order raised by an outsourcing organization for shipping components required for manufacturing an assembly type at an external organization is referred to as a replenishment sales order.

On receiving a receipt indication indicating the successful delivery of the order, the digital processing system calculates a net payable amount to be paid to the external organization consistent with the chargeable subcontracting model. The net payable amount may equal the difference of an aggregate payable price for the desired quantity of the first assembly type and an aggregate receivable price of the corresponding number of the set of components.

Another aspect of the present invention facilitates setting up of a digital processing system for supporting chargeable subcontracting model. In an embodiment, a user provides the price information for the components and assembly types. In addition, both the outsourcing and external organization are setup as inventory organizations capable of keeping track of items (assembly types and components).

Further, a supplier role is assigned to the external organization indicating that the external organization supplies a first assembly type. Supplier and customer roles are respectively assigned to the outsourcing and external organizations indicating that the outsourcing organization supplies the set of components required for manufacturing the first assembly type to the external organization. Such assignment of roles ensures that the sales orders (to facilitate shipping) for the set of components are raised when an order indication for the first assembly type is received.

Yet another aspect of the present invention enables planning of orders for assembly types and components. In one embodiment, multiple sourcing rules for assembly types and components are specified for each of the outsourcing and external organizations. The sourcing rules are set up to reflect the chargeable subcontracting model. On receiving a forecasted quantity of a first assembly type in a future period, multiple planned orders are generated based on the sourcing rules, and released as corresponding actual orders.

One more aspect of the present invention simulates a set of actions performed in the external organization in response to receiving an order indication for a desired quantity of an assembly type. A discrete job is created enabling the external organization to track the inventory of the assembly type. Further, purchase orders for a corresponding number of each of the set of components required for manufacturing the assembly type are generated triggering the raising of corresponding sales orders for the components at the outsourcing organization.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Scenario

Figure 1:
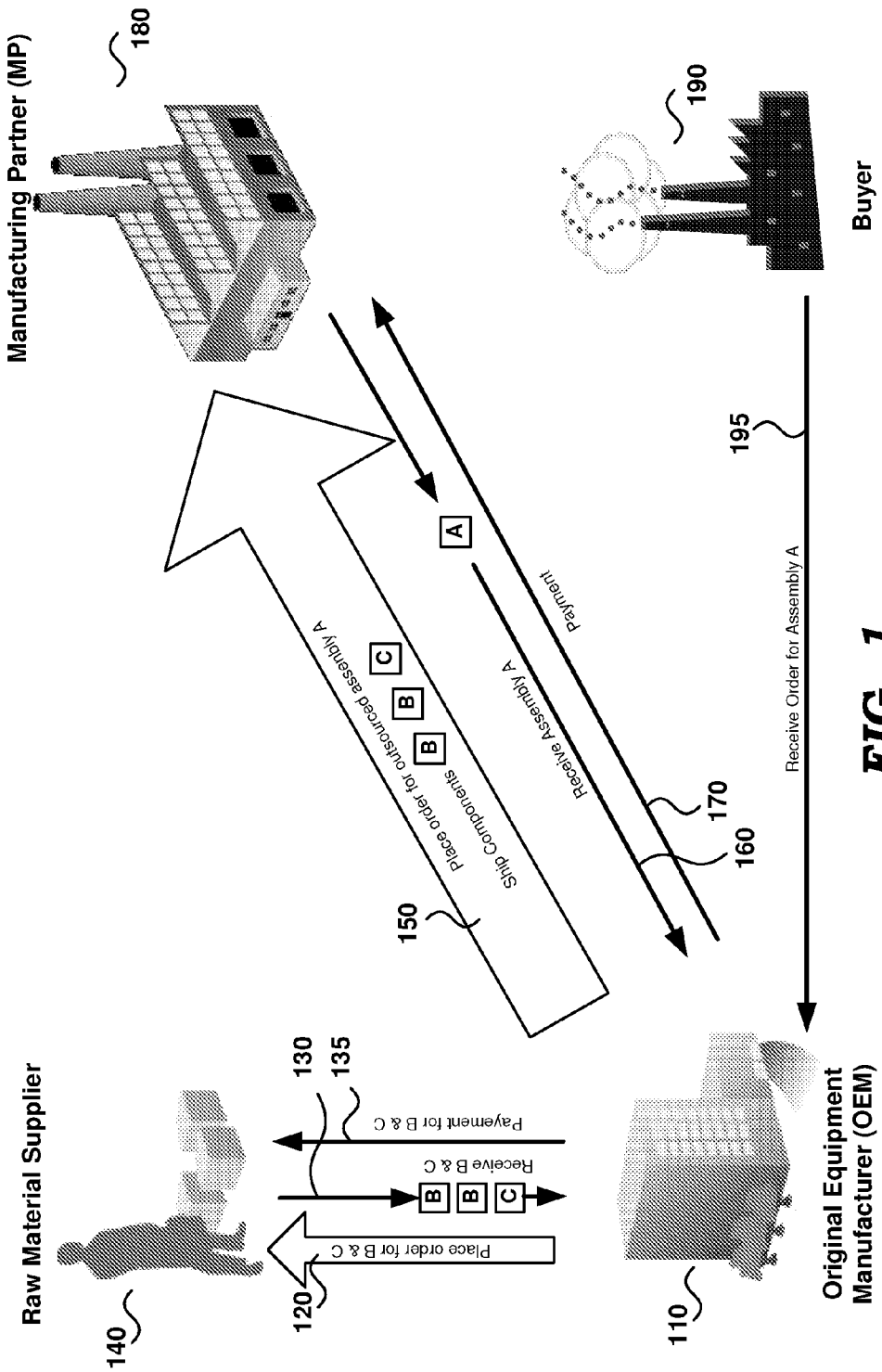
FIG. 1 is a block diagram illustrating an example scenario in which several aspects of the present invention can be implemented.

FIG. 1 is a block diagram illustrating an example scenario in which several aspects of the present invention can be implemented. The block diagram is shown containing original equipment manufacturer (OEM) 110, raw material supplier (RMS) 140, manufacturing partner (MP) 180, and buyer 190. The transactions between the four organizations in manufacturing of various assembled units are described below assuming a scenario in which 2 units of component B and one unit of component C are required for manufacturing one unit of an assembly type A (an assembled unit).

Merely for illustration, only representative number/type of organizations and transactions are shown in the Figure. Many scenarios often contain many more organizations and transactions, both in number and type, depending on the purpose for which the scenario is designed. Each block of FIG. 1 is described below in further detail.

Raw material supplier (RMS) 140 supplies various raw materials needed for the manufacturing of various assembly types (that is, assembled units). On receiving a purchase order 120 for a specified number of each component (B and/or C), RMS 140 supplies the ordered number of components to OEM 110. Purchase order 120 may represent a physical/electronic document sent by a customer organization (OEM 110) that specifies commodities/items ordered from a specific supplier organization (RMS 140). Purchase order 120 may also include other information such as price, terms, and conditions related to the order.

In one embodiment, the supplier ships the components required for manufacturing of the assembly types to the location of the OEM (as represented by shipment 130), though the components can be shipped to other physical locations (e.g., MP 180) in alternative embodiments. On successful shipment, RMS 140 may receive appropriate payment 135 from OEM 110.

Manufacturing Partner (MP) 180 represents an example external organization to which manufacturing of different assembly types can be outsourced. Thus, MP 180 manufactures different assembly types using corresponding components in response to receiving corresponding sub-contracting orders. The orders are according to the chargeable subcontracting model in which the OEM provides the components required for manufacturing each assembly type and the MP is paid only for the additional value as noted above in the background section. MP 180 may receive orders from different OEMs for different assembly types and for corresponding number of different units.

Original Equipment Manufacturer (OEM) 110 represents an example outsourcing organization, which outsources the manufacturing of assembly types to external organizations such as MP 180. OEM 110 procures the necessary components from RMS 140 and places the order for the corresponding desired number of units of assembly types. The components may be shipped to MP 180 when placing the corresponding order. OEM 110 pays MP 180 for the additional value provided by the manufacturing partner in manufacturing the ordered units of the assembly type.

Buyer 190 represents a buyer organization which orders a desired number of units of an assembly type from OEM 110. OEM 110 may outsource the manufacturing of assembly types to the external organization (MP 180) in response to receiving such orders from buyer 190.

In the illustrative example depicted in FIG. 1, OEM 110 is shown receiving an order (195) from buyer 190 for a desired number of units of assembly type A. In response to such orders from potentially several buyer organizations, OEM 110 is shown procuring components 2 units of B and 1 unit of C from RMS 140 (for each assembly unit sought to be manufactured), and then placing an order (150) for the aggregate desired number of units of assembly type A to MP 180. 150 may also represent the shipment of the components (B and C) required for manufacturing the desired number of units of the assembly type A. OEM 110 pays MP 180 an amount reflecting the value addition (as shown as 170), as noted above. The payment may be sent in response to receiving the manufactured assembly units (shipment 160). OEM 110 may then send (not shown) the assembly units received from MP 180 to buyer 190.

An aspect of the present invention enables an outsourcing organization (such as OEM 110) to maintain various types of information with respect to such orders according to chargeable subcontracting model. In an embodiment described below (with reference to FIGS. 2-10) in further detail, such information is maintained in a digital processing system located at the outsourcing organization.

It should be appreciated that at least some of the features described below can be implemented in various embodiments as a desired combination of one or more of hardware, software and firmware. The description is continued with respect to an embodiment in which various features are operative when software instructions are executed.

3. Digital Processing System

Figure 2:
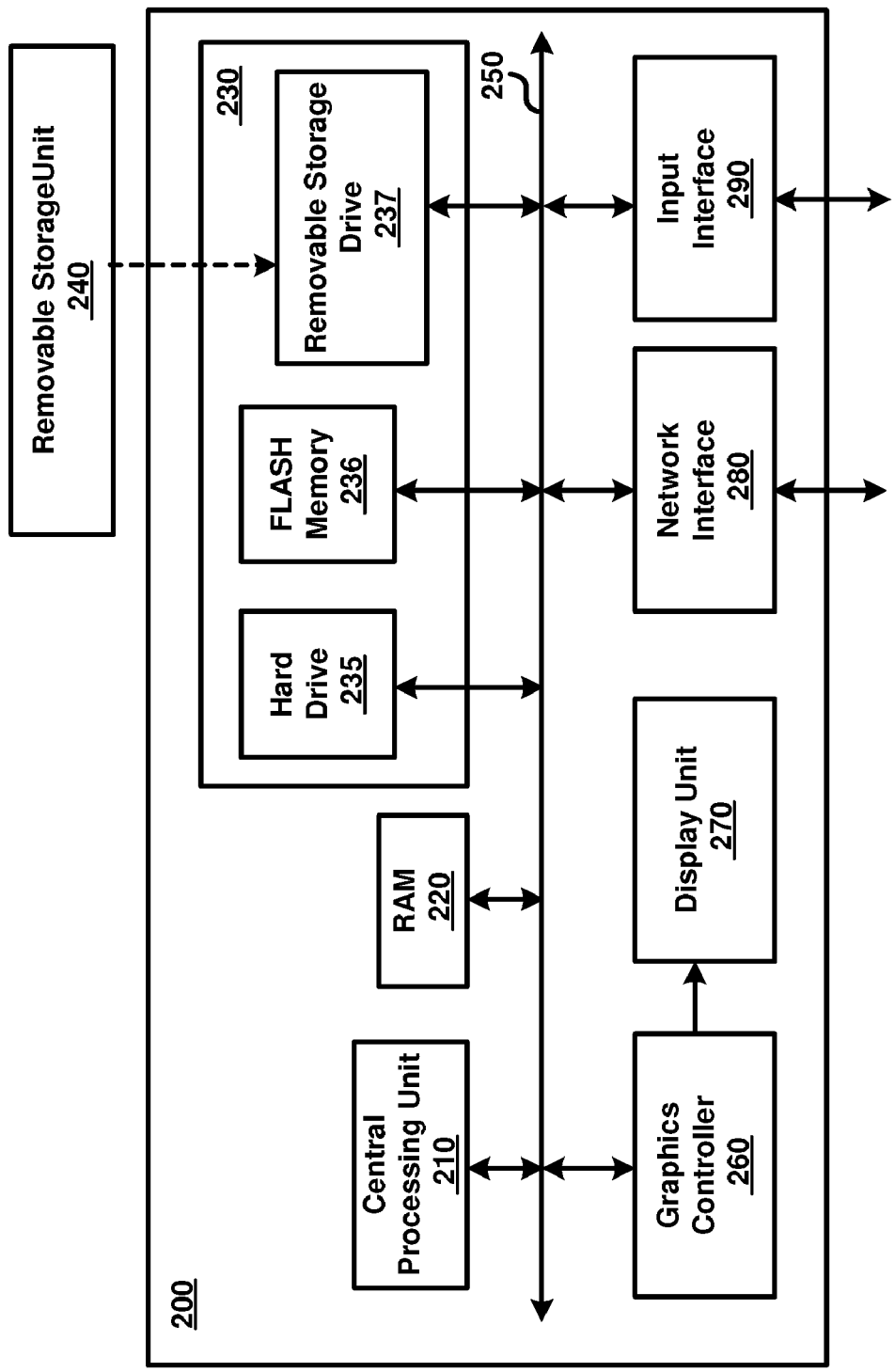
FIG. 2 is a block diagram illustrating the details of a digital processing system in which various aspects of the present invention are operative by execution of appropriate software instructions.

FIG. 2 is a block diagram illustrating the details of digital processing system 200 in which various aspects of the present invention are operative by execution of appropriate software instructions. Though shown as a single unit merely for illustration, the system may be implemented as multiple discrete (independent) units cooperatively communicating, for example, over a network.

Digital processing system 200 may contain one or more processors (such as a central processing unit (CPU) 210), random access memory (RAM) 220, secondary memory 230, graphics controller 250, display unit 270, network interface 280, and input interface 290. All the components except display unit 270 may communicate with each other over communication path 250, which may contain several buses as is well known in the relevant arts. The components of FIG. 2 are described below in further detail.

CPU 210 may execute instructions stored in RAM 220 to provide several features of the present invention. CPU 210 may contain multiple processing units, with each processing unit potentially being designed for a specific task. Alternatively, CPU 210 may contain only a single general-purpose processing unit. RAM 220 may receive instructions from secondary memory 230 using communication path 250.

Graphics controller 250 generates display signals (e.g., in RGB format) to display unit 270 based on data/instructions received from CPU 210. Display unit 270 contains a display screen to display the images defined by the display signals. Input interface 290 may correspond to a keyboard and a pointing device (e.g., touch-pad, mouse). Network interface 280 provides connectivity to a network (e.g., using Internet Protocol), and may be used to communicate with other external systems (e.g., those provided by MP 180, RMS 140 or others).

Secondary memory 230 may contain hard drive 235, flash memory 235, and removable storage drive 237. Secondary memory 230 may store the data and software instructions, which enable digital processing system 200 to provide several features in accordance with the present invention.

Some or all of the data and instructions may be provided on removable storage unit 240, and the data and instructions may be read and provided by removable storage drive 237 to CPU 210. Floppy drive, magnetic tape drive, CD-ROM drive, DVD Drive, Flash memory, removable memory chip (PCMCIA Card, EPROM) are examples of such removable storage drive 237.

Removable storage unit 240 may be implemented using medium and storage format compatible with removable storage drive 237 such that removable storage drive 237 can read the data and instructions. Thus, removable storage unit 240 includes a computer readable (storage) medium having stored therein computer software and/or data. However, the computer (or machine, in general) readable medium can be in other forms as well (e.g., non-removable, random access, etc.).

In this document, the term "computer program product" is used to generally refer to removable storage unit 240 or hard disk installed in hard drive 235. These computer program products are means for providing software to digital processing system 200 and control the operation thereof. CPU 210 may retrieve the software instructions, and execute the instructions to provide various features of the present invention described below.

4. Supporting Chargeable Subcontracting

Figure 3:
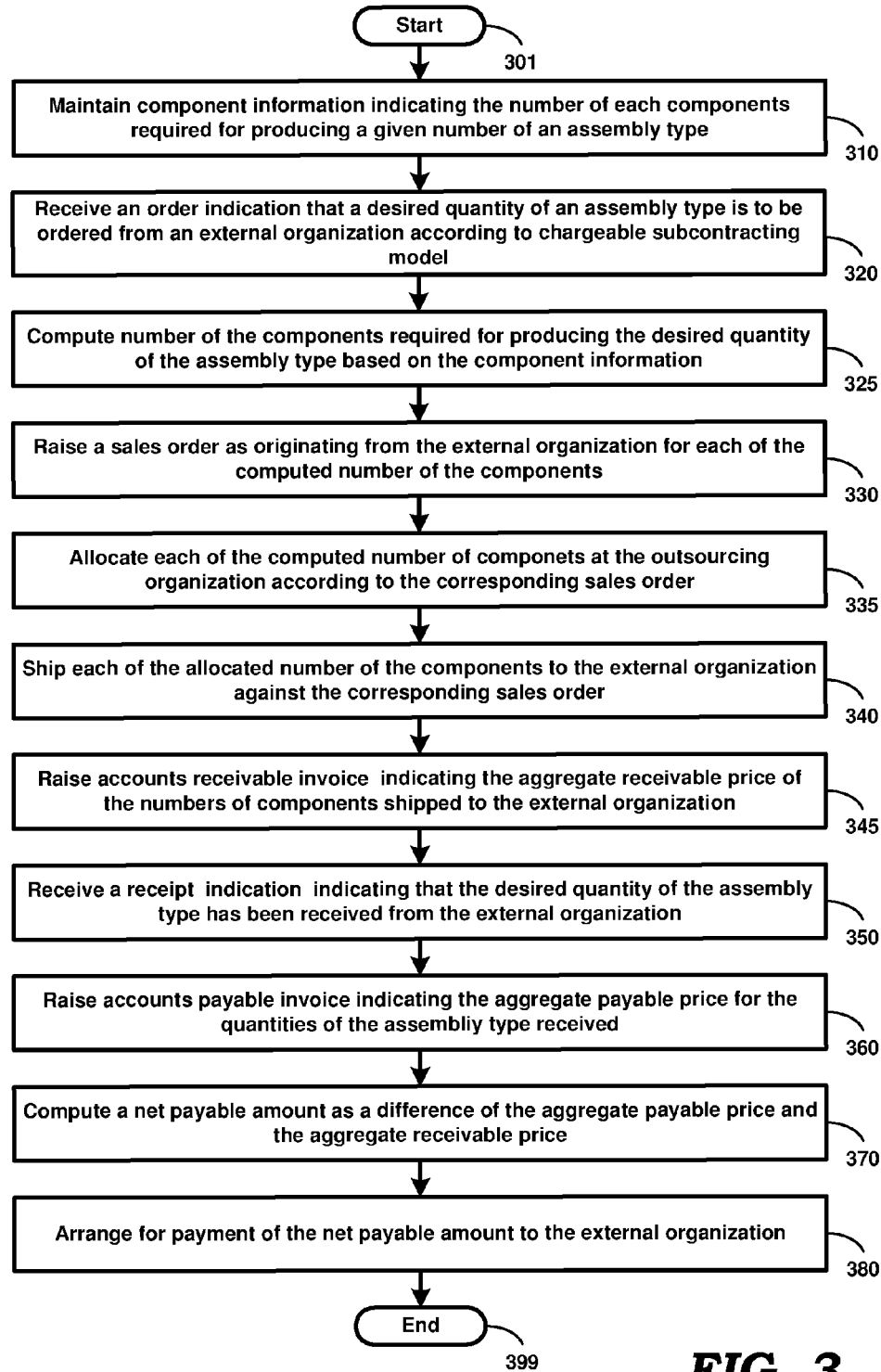
FIG. 3 is a flowchart illustrating the manner in which manufacturing transactions according to chargeable subcontracting model are supported according to an aspect of the present invention.

FIG. 3 is a flowchart illustrating the manner in which manufacturing transactions according to chargeable subcontracting model are supported according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 310.

In step 310, CPU 210 maintains component information indicating the number of each components required for producing a given number (e.g., 1) of units of assembly type. Thus, in the illustrative scenario of FIG. 1, the information indicates that 2 units of component B and 1 unit of component C are required for manufacturing each unit of assembly type A. The component information may be stored within secondary storage 230 or received via network interface 280 from an external system (e.g., a database server, not shown).

Merely for ease of understanding such a simplified requirement is chosen. In realistic scenarios many more number/type of components may be required for manufacturing an assembly type and the required number of units may need to be according to more complex formula (e.g., 10% extra to account for component defects or inefficiencies in the manufacturing process).

In step 320, CPU 210 receives an order indication that a desired quantity of an assembly type is to be ordered (procured or purchased) from an external organization (MP 180) according to chargeable subcontracting model. The order indication may be received from an appropriate input component (e.g., input interface 290) or from an external system (not shown) via network interface 280. In one embodiment described below, the order indication is deemed to be received when a subcontracting order is raised by a user (for example, in response to receiving purchase orders for the respective desired quantities of the assembly type from a buyer organization). Alternatively, the subcontracting order may be generated automatically by digital processing system 200 in the outsourcing organization in response to many such purchase orders received from various buyer organizations.

A subcontracting order generally refers to a purchase order sent by an outsourcing organization specifying the number of items of an assembly type ordered from an external organization according to chargeable subcontracting model. Though the description is provided for a single assembly type in a subcontracting order, it should be appreciated that multiple assembly types (each for a corresponding desired quantity) may be ordered in a single order.

In step 325, CPU 210 computes the number of each of the components required for producing the desired quantity of the assembly type based on the component information. The component information may be examined to determine the corresponding count of each of the components required for manufacturing each unit of ordered assembly type and the number of each components may be computed based on the determined information, in response to receiving the order indication.

In step 330, CPU 210 raises a sales order as originating from the external organization for each of the computed numbers of the components. In general, raising entails automatic creation (i.e., without a user having to expressly indicate the creation of the sales order) of the sales order within digital processing system 200. The creation would save the appropriate data (in the secondary storage, typically) indicating that the sales order has been created.

Thus, assuming 100 units of A are ordered, a sales order may be generated for 200 units of B and 100 units of C in the illustrative example depicted in FIG. 1. Raising a sales order enables allocation and tracking of the shipment status for the components deemed to have been ordered by MP 180 to facilitate manufacturing of the ordered/desired quantify of the assembly type.

In step 335, CPU 210 allocates each of the computed number of components at the outsourcing organization according to the corresponding sales order. Allocation refers to the process of reserving the quantity of the components (as indicated by a corresponding sales order) in the outsourcing organization as being required for manufacturing an assembly type in the external organization. Such a feature provides the outsourcing organization visibility about the components to be shipped (expected to be shipped or already shipped) and its expected usage in the external organization.

Thus, CPU 210 allocates 200 units of B and 100 units of C corresponding to the sales order generated in step 330 in the illustrative example depicted in FIG. 1. Such allocation may be performed automatically by CPU 210 in response to the raising of the the sales orders or alternatively a user may be provided appropriate interfaces for performing manual allocation of the components.

In step 340, each of the allocated number of the components is shipped to the external organization against the corresponding sales order raised in step 330, for example, from OEM 110 to MP 180, as depicted in FIG. 1. The components may be shipped in different batches and corresponding acknowledgements may be received from MP 180 (indicating successful delivery).

In step 345, CPU 210 raises an accounts receivable (AR) invoice indicating the aggregate receivable price of the number of components shipped to the external organization. An AR invoice generally refers to a physical/electronic document that identifies the (monetary) consideration that is to be received by a supplier/outsourcing organization for providing items and/or services to a customer/external organization. As may be appreciated, the AR invoice may be raised consistent with the requirements of the chargeable subcontracting model. The invoice may be raised upon shipment consistent with the contract terms between OEM 110 and MP 180.

The pricing information (e.g., as a price per unit of a component) may also be maintained within the component information, and the aggregate receivable price may be calculated based on the pricing information (e.g., multiplying the number of each component with corresponding price, and summing the results of multiplication for all the components shipped).

In step 350, CPU 210 receives a receipt indication indicating that the desired quantity of the assembly type has been received from the external organization. It should be appreciated that the ordered quantity of the assembly type may be received in multiple batches (as corresponding portions) and for simplicity it is assumed that the receipt indication is received after receipt of all the ordered quantity. Thus, the receipt indication represents fulfillment of the subcontracting order.

In step 360, CPU 210 raises accounts payable (AP) invoice indicating the aggregate payable price for the quantities of the assembly type received. An AP invoice generally refers to a physical/electronic document that identifies the (monetary) consideration to be paid by a customer/outsourcing organization for items provided by a supplier/external organization. The aggregate payable price can be based on any formula, and reflects the sum of aggregate receivable price of step 345 and the additional value noted above. The AP invoice again is consistent with the chargeable subcontracting model of interest.

In step 370, CPU 210 computes a net payable amount based on the aggregate payable price and the aggregate receivable price, consistent with the chargeable subcontracting model. In an embodiment, the net payable amount is computed as a difference of the aggregate payable price and the aggregate receivable price, thereby equaling the additional value provided by the external organization in fulfilling the order. It may be appreciated that the aggregate payable price and the aggregate receivable price may be retrieved from the AP invoice and AR invoice respectively.

In step 380, payment of the net payable amount to the external organization is arranged. The payment can be by various paper instruments such as checks or electronically by interfacing with the appropriate payment gateways. The flowchart ends in step 399.

Thus, by using digital processing systems implemented according to the flowchart of FIG. 3, the task of outsourcing organizations in supporting orders based on chargeable subcontracting model may be substantially simplified. The ease of use may be enhanced by appropriate set up of the digital processing systems. Accordingly the description is continued first with an example approach to enabling set up of the digital processing systems to support chargeable subcontracting models.

5. Setting Up Chargeable Subcontracting

Figure 4:
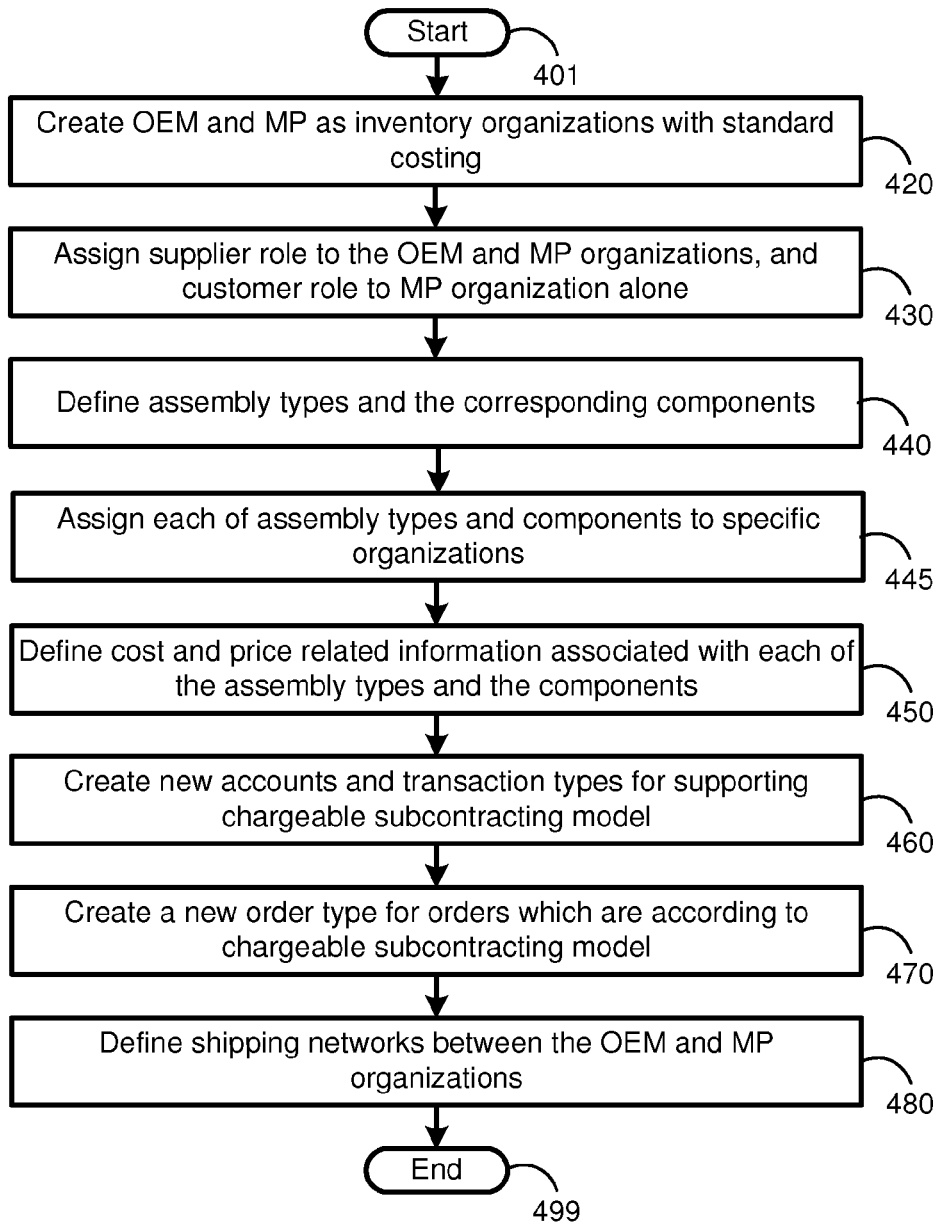
FIG. 4 is a flowchart illustrating the manner in which a digital processing system may be set up to support chargeable subcontracting models according to an aspect of the present invention.

FIG. 4 is a flowchart illustrating the manner in which a digital processing system may be set up to support chargeable subcontracting models according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention.

Each of the steps of FIG. 4 is based on appropriate user inputs, typically from members of the OEM organization. Thus, the user may be required to provide the corresponding information by appropriate interfaces. The flow chart begins in step 401, in which control immediately passes to step 420.

In step 420, CPU 210 creates OEM 110 (the outsourcing organization) and MP 180 (the external organization) as inventory organizations with standard costing. An inventory organization implies that the organization keeps an inventory as related to the orders of OEM. In the illustrative example of FIG. 1, both OEM and MP organizations may keep inventory of components B and C, as well as units of assembly type A. Standard costing refers to a costing approach used to calculate the value of the transactions wherein the cost of each component/assembly type is fixed manually by the user. Such costs of components are used for internal accounting and typically do not reflect the prices on the sales/purchase orders of the components or assembly types.

It should be appreciated that the creation of MP 180 as inventory organization within the digital processing system 200 maintained by OEM 110, is merely for the purpose of 'simulating' the purchase and sale transactions underlying the chargeable subcontracting model.

In step 430, CPU 210 assigns supplier role to the OEM 110 and MP 180 organizations, and customer role to MP organization alone. As may be appreciated such assignment is consistent with the nature of the underlying orders/transaction sought to be supported according to the chargeable subcontracting model since OEM is a supplier of components, while MP is a customer in the simulated purchase of components from the OEM and is a supplier of the units of assembly types.

In step 440, CPU 210 defines assembly types and the corresponding components. Thus, in the illustrative example of FIG. 1, the user may first indicate that B and C are components, and A is assembly type. The user may further indicate that B and C are required for manufacturing assembly type A, and also the count of each component required for manufacturing a given number of units of assembly type A. In one embodiment, this information is embodied in a bill of material (BOM), which indicates the count of each component for a single unit of assembly type A.

In step 445, CPU 210 assigns each of the components and assembly type to the specific organization defined in step 420. In conjunction with the role assigned in step 430, the assignment would indicate whether an organization is a supplier or customer of the assigned component/assembly type.

In step 450, CPU 210 defines cost and price related information associated with each of the assembly types and components from the perspective of OEM. Thus, cost refers to the consideration paid by OEM 110 when procuring raw material/components (B and C) from RMS 140. On the other hand, price refers to the consideration deemed to be paid by MP 180 when the same components are supplied by OEM 110 to MP 180.

With respect to assembly types, cost refers to the sum of the costs of the components required for manufacturing the unit of the assembly type added to the 'additional value' provided by the manufacturing partner, while price refers to the consideration deemed to be paid by OEM 110 when procuring the assembly type from MP 180.

In step 460, CPU 210 creates new accounts and transaction types for supporting chargeable subcontracting model. The transaction types enable the deemed transactions to be supported with digital processing system 200. In particular, the AR invoices noted above are raised in relation to the newly created accounts and transaction types.

In step 470, CPU 210 creates a new order type for orders, which are according to chargeable subcontracting model. Thus, when an order is raised later, CPU 210 simply associates the order with the new order type to cause the order indication of step 320 to be provided to CPU 210. Digital processing system 200 thereafter supports processing of the order according to chargeable subcontracting model.

In step 480, CPU 210 defines shipping networks between the OEM and MP organizations. Configuration of a shipping network is a pre-condition for digital processing system 200 to maintain information on the movement of components and assembly types between the two organizations. In the illustrative example, a shipping network may indicate shipments from OEM 110 and MP 180 and another network may indicate shipments in the reverse direction. The flowchart ends in step 499.

The description is continued with respect to an example user interface by which digital processing system 200 enables a user to set up support for chargeable subcontracting model and then manage orders with external organization.

6. Setting up Organizations, Assembly Types and Components

Figure 5A:
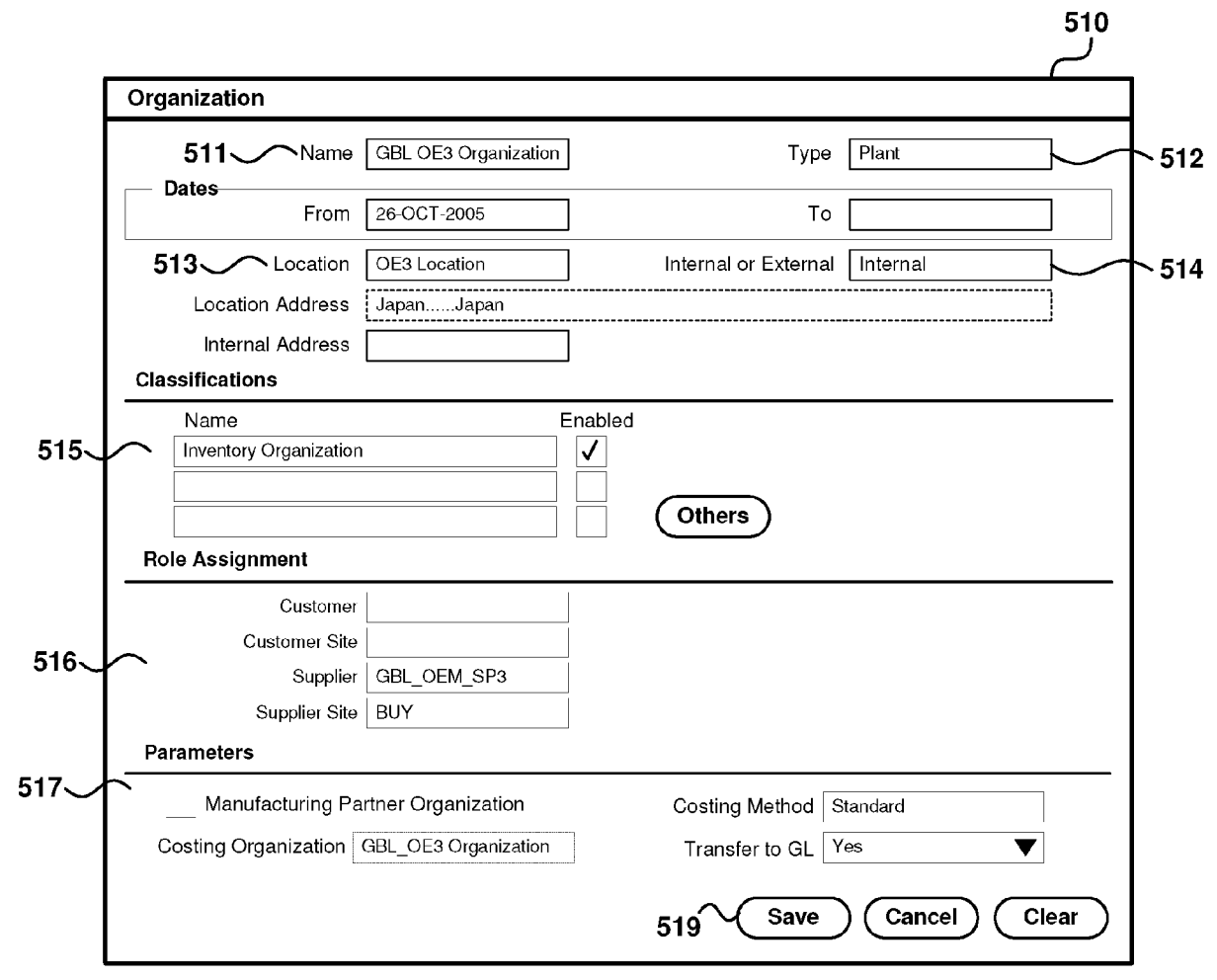

FIG. 5A depicts the manner in which a user creates OEM 110 as an inventory organization (step 420) and assigns supplier role (step 430) to the organization in one embodiment. Display area 510 (as well as all the following FIGS. 5B-8F) is displayed on a display screen provided on display unit 270, and a user may provide inputs (described below) using input interface 290.

In general, each display area (of FIGS. 5A-8F) may be viewed as containing multiple fields with corresponding labels provided by the CPU 210 (according to the executed software instructions), and a user (in OEM 110) may enter an appropriate value for each field, as desired. In all the Figures, fields that require user inputs are shown as solid lines boxes, while fields whose values are generated by digital processing system 200 are shown as dotted line boxes.

Fields 511, 512, and 513 enable a user to specify the name ("GBL OE3 Organization"), type and location/address of an organization. The value of 'Internal' in field 514 indicates that the outsourcing organization is defined to be an internal organization.

Display area 515 enables a user to specify that the organization is an inventory organization as indicated by the check mark in the Enabled check box. Display area 516 enables a user to assign customer or supplier role to the organization. Here it is shown that OEM 110 is assigned a supplier role.

Display area 517 enables a user to specify various inventory/costing parameters for the organization being defined. As may be readily observed, OEM 110 is not a manufacturing partner organization as indicated by the absence of the selection in the corresponding check box. Further, OEM 110 is set up to operate with 'Standard' costing method and transactions that are to be transferred to general ledger (GL) as indicated by the 'Yes' value.

Button 519 enables a user to save the information provided in display area 510, causing CPU 210 to create an organization based on the provided information. Thus, a user creates OEM 110 as an inventory organization with standard costing and assigns the role of a supplier.

Similarly, in display area 520 of FIG. 5B, a user is shown creating MP 180 as an inventory organization with standard costing and assigning the roles of supplier and customer (as depicted in display area 526). In particular, the values 'Third Party' and 'External' in fields 522 and 524 and the selection of check box "Manufacturing Partner Organization" in display are 527 indicate that the organization is being created as a manufacturing partner organization external to the outsourcing organization created in FIG. 5A.

It may be appreciated that MP 180 is set up such that transactions are not transferred to GL (as indicated by the 'No' value in display area 527) since MP 180 is a simulated organization within digital processing system 200. Display portions 521, 523 and 525 operate similar to respective portions 511, 513 and 515 of FIG. 5A and the description is not repeated for conciseness.

Button 529 enables a user to save the information provided in display area 520, causing CPU 210 to create MP 180 as an inventory organization with standard costing with the roles of supplier and customer assigned to it.

FIG. 5C depicts the manner in which an assembly type is defined (step 440) and assigned to specific organizations (step 445) in one embodiment. Fields 531, 532 and 533 together enable a user to specify an item OSA-A (corresponding to assembly type A in the illustrative example of FIG. A) with description 'Outsourced Assembly-A' for a general organization 'VI—Vision Operations'.

Display area 534 indicates that the displayed attributes of the item are applicable for all organizations (as shown by selection of ALL). Display area 535 enables a user to specify the units of measure associates with the item. Display area 536 enables a user to specify the type of the item (e.g., purchased item, indicating that the item is purchased from other organizations), the status of the item (such as "active") and a long description describing the item characteristics in detail.

Table 537 depicts the various organization defined in the system, thereby enabling the user to assign the item to specific organizations. It should be noted that the two organizations of FIGS. 5A and 5B are depicted in the respective rows 538A and 538B. In particular, row 538A shows that the item is assigned (the selected check box in the Assigned column) to the OEM organization of FIG. 5A (based on the value in the Name column). The item is shown assigned to MP 180 (named "GBL TP3 Organization" as indicated in FIG. 5B) as well as the general organization VI.

A user may select one of the organizations in table 537 assigned to the item and click/select button 539 to define the attributes of the item specific to the organization using the interface shown in FIG. 5D.

Each of FIGS. 5D, 5E and 5F depicts the manner in which a user specifies attributes of a component/assembly type specific to an (outsourcing or external) organization in one embodiment.

In FIG. 5D, it may be observed that display area 542 displays the same information as fields 532 and 533 and the information corresponding to the (OEM) organization selected in table 537 in invoking display area 540. Display area 544 indicates that the attributes are specific only to the OEM organization as indicated by selection of 'ORG'.

Display area 545 specifies the manner which purchasing of the item (assembly type OSA-A) is to be performed. It may be observed that the item is indicated to be an outsourced assembly (the selection of the check box in Outsourced Assembly field).

Display area 546 specifies the manner in which the general planning of procuring the selected item is to be performed in OEM 110 organization. In particular, the inventory is not planned and the 'Make or Buy' decision is indicated to be 'Buy', specifying that the assembly type be bought from an external organization.

Display area 548 specifies further planning details, in particular, the release time fence (the time period within which the planned orders can be converted to actual orders). A blank value indicates that the planned orders can be converted as purchase orders at any time (potentially immediately). Button 549 enables a user to save the information provided in display area 540.

FIG. 5E is similar to FIG. 5D and defines the attributes of assembly type OSA-A specific to MP 180 as indicated in display area 552. Consistent with the illustrative example of FIG. 1, the 'Make or Buy' field in display area 556 is set to 'Make', specifying that the assembly type/item is made by MP 180. Further, the value of release time fence in display area 558 is set to 'Do Not Release Auto or Manual' indicating that all orders are never to be converted as actual orders (since MP never places orders for this assembly type).

Similarly items Comp-B and Comp-C (corresponding to components B and C) may be defined using an interface similar to that shown in FIG. 5C and the similarities are not described again for conciseness. The attributes specific to each organization for the components would be different (from those for the assembly type in FIGS. 5D/5E) as depicted in FIG. 5F.

FIG. 5F is similar to FIG. 5D and defines the attributes of component B specific to OEM 110 as indicated in display area 562. It may be noted that in display area 566, the field Sub-contracting Component is selected to be 'synchronized' (procure or supply when required) and the 'Make or Buy' field is selected to equal 'Buy', indicating that the item is to be procured when required. Such procurement may be from RMS 140. Display area 568 is similar to display area 548 and indicates that all planned orders are to be raised as purchase orders immediately (as indicated by the blank value in 'Real Time Fence' field).

FIG. 5G depicts the manner in which a bill of materials (BOM) identifying the component requirements for manufacturing units of an assembly type, is created in one embodiment. Display area 572 indicates that the bill of materials is being created for the assembly type OSA-A (corresponding to assembly type A in the illustrative example of FIG. 1).

Further display area 572 indicates that the BOM is applicable for a single unit of the item as indicated by 'Ea' in the UOM field.

Table 574 enables a user to specify the various components required for manufacturing the assembly type. Thus, rows 576 and 577 together indicate that 2 units of Comp-B and 1 unit of Comp-C are required for manufacturing each unit of assembly type OSA-A. The description is continued describing the manner in which cost and price related information for the components and assembly types (created as explained above) is setup.

7. Setting Up Cost/Price, Account/Transaction Type and Shipping Networks

FIGS. 6A-6C together depicts the manner in which a user defines cost and price related information for assembly types and corresponding components (step 450) in an embodiment. Each Figure is described below in further detail.

FIG. 6A depicts the manner in which the cost of a component (for OEM 110) is defined in an embodiment. The Figure shows that unit cost of item "comp-B" (display area 612) is 2 dollars (field 618). The cost is shown to include only material cost of 2 dollars (field 616). Similarly, cost of comp-C is defined to be 3 dollars (not shown).

FIG. 6B is similar to FIG. 6A, and depicts that the unit cost of assembly type "OSA-A" (display area 622) is 12 dollars (field 628). The cost includes material cost of 7 dollars (field 626) and outside processing cost of 5 dollars (field 627). The 7 dollars represents the cost of 2 units of B and 1 unit of C consistent with the BOM of FIG. 5G (and CPU 210 may perform the necessary computations). The 5 dollars represents the additional value provided by the manufacturing partner/external organization while manufacturing each unit of the assembly type.

FIG. 6C enables a user to specify the prices related information corresponding to components in one embodiment. The price information is the consideration deemed to be paid by MP 180 to OEM 110 for supplying the required components. Rows 637 and 638 of table 636 indicate that the price of respective components comp-B and comp-C is defined to be 4 dollars and 6 dollars according to chargeable subcontracting model (display area 632).

CPU 210 derives the price of the assembly type OSA-A based on the contract (not shown in the Figure), where the price of assembly type OSA-A is calculated and defined manually based on the price information of components of FIG. 6C and the cost of outside processing (field 627 of FIG. 6B). For example, the price may be determined to be $19 from the computation of [($4×2 units of B)+($6×1 unit of C)+$5 of value addition]. Alternatively, the user may fix the price of $19 for OSA-A in such a way that the difference between the price of the assembly type and the sum of the prices of the components equals the value addition (field 627).

FIG. 6D depicts the manner in which a new transaction type for supporting chargeable subcontracting model is created (step 460 of FIG. 4) in an embodiment. Display area 642 specifies that a new transaction type "Chargeable Subcontra" of class invoice be created for the general organization VI (referred to as an operating unit authorized to create sales and purchase orders on behalf of the outsourcing and external organizations (defined associated to the operating unit VI) and facilitating performance of functions such as purchasing, sales, invoicing etc.). Further, it is indicated that the invoices (of this transaction type) are to be posted to the general ledger.

It may be appreciated that accounts specified in fields 647 and 648 correspond to new accounts created (in a known manner and not shown/described) for supporting the chargeable subcontracting model. Button 649 enables a user to save the information provided in display area 640, causing CPU 210 to create a new transaction type as specified by the user.

FIG. 6E depicts the manner in which a new order type is created for orders, which are according to chargeable subcontracting model (step 470) in one embodiment. Display area 652 depicts a new order type called "Chargeable Subcontracting" defined for the general organization VI, and is of type 'Sales Order'.

Display areas 657 and 658 depict the association of the order type with the transaction type (created in FIG. 6D) as the invoice source and the receivable transaction type respectively. It may be appreciated that the invoice/transaction source facilitates identifying the invoices of the components shipped to the external organization as per chargeable subcontracting model while the receivable transaction type indicates the revenue and receivables accounts to which the amounts are to be posted as per chargeable subcontracting model.

FIG. 6F depicts the manner in which shipping networks between the OEM and MP organizations are defined (step 480) in one embodiment. Row 667 of table 664 specifies a shipping network from OEM 110 to MP 180 (supporting chargeable subcontracting model as indicated by the selected checkbox in the "Chargeable Subcontracting Enabled" column) for the outsourcing OEM organization (display area 662).

It may be noted that the default order type of the shipping network in row 667 is indicated (in column "Default Order Type") to be chargeable subcontracting order type defined in FIG. 6E, thereby ensuring that all orders raised between OEM 110 and MP 180 support chargeable subcontracting model. Similarly, a shipping network in the reverse direction may also be defined. Further, similar shipping networks may be independently defined associated with MP 180 also.

Thus, a digital processing system may be set up to support chargeable subcontracting models. The manner in which such a digital processing system process an order indication is described below with examples.

8. Processing Order Indication

FIGS. 7A-7H illustrate the manner in which order indications may be processed (by digital processing system 200) in an embodiment of the present invention. Each Figure is described below in further detail.

FIG. 7A depicts the manner in which a user generates an order indication, indicating a desired quantity of an assembly type is to be ordered according to chargeable subcontracting model, in an embodiment. Alternatively CPU 210 may create an order indication based on the manner in which chargeable subcontracting is setup.

Display area 711 indicates the order number of 6375 (field 712) for procuring items from MP 180 (as indicated by the value "GBL_TP03" in the Supplier field), and the total amount as being $1900 (field 713). Row 715 indicates that the procured item is 100 units of assembly type OSA-A at the rate of $19 each.

It may be noted that the order line (row 715 in the FIG. 7A) is identified as a subcontracting order based on the "Yes" value set for the attribute "Outsourced assembly" in the setup for the assembly type OSA-A (as indicated in display area 545 in FIG. 5D). As such row 715 indicates that 100 units of outsourced assembly type "OSA-A" are to be purchased at a deemed payment of $1900 (total amount).

Button 718 enables a user to approve the purchase order (using an appropriate interface not shown). On approval of the purchase order, CPU 210 receives an order indication (step 320) that the order is to be processed according to chargeable subcontracting model.

CPU 210 then computes the number of components required for producing the desired quantity (100 units) of assembly type OSA-A based on the component information provided earlier in FIG. 5C-5G. CPU 210 also raises sales orders as originating from MP 180 for each of the computed quantities of the components as depicted in FIGS. 7B-7F (step 330). Further, CPU 210 automatically allocates the components indicated by each of the raised sales orders (step 335).

FIG. 7B provides an interface for searching for approved purchase orders in an embodiment. Field 721 enables a user to select pre-defined keywords such as 'Subcontracting Order' or 'Replenishment Order' to indicate the orders of interest to be searched. For example, selection of 'Subcontracting Order' keyword indicates that only orders of chargeable subcontracting type be searched.

Thus, on a user specifying Order Type as 'Subcontracting Order' (field 721), the specific (subcontracting) order number 6375 (field 723), and clicking button 725, the details of the order is displayed in table 726 (header details) and 727 (line details).

Row 728 indicates that 100 units of OSA-A has been ordered at the rate of $19 and 0 units have been received. A user may click on link 729 for viewing the shipment details (corresponding to the specific subcontracting order) using the interface depicted in FIG. 7C.

FIG. 7C depicts all the components required for manufacturing a subcontracted assembly type (OSA-A), in an embodiment. Table 735 depicts the details of the components required by the subcontracting order number "6375" (label 731) for assembly type OSA-A (as depicted in display area 733).

Each of rows 737 and 738 specifies a sales order for a component required for manufacturing the assembly type OSA-A. In particular, row 737 indicates that 200 units of comp-B are to be supplied at the rate of $4 each and that component is a synchronized component. Similarly row 738 indicates that 100 units of comp-C are to be supplied at the rate of $6. The column "Allocated quantity" with a non zero number may indicate that sales orders for the non zero number of corresponding components for shipping to the external organization have been raised (and/or that the non zero number of components have already been shipped).

It may be appreciated that the number of units for the components Comp-B and Comp-C are computed by CPU 210 based on the information provided in BOM of FIG. 5G. A user may also click/select button 739 to view the BOM and manually verify that the components have been ordered as per the setup of the assembly type.

FIG. 7D depicts the details of a single sales order raised as originating from MP 180 for a component (Comp-B) required for manufacturing an assembly type in an embodiment. It may be noted that such sales orders raised for supporting chargeable subcontracting model are referred to as replenishment (sales) orders.

Tables 746 and 748 are displayed in response to a user performing a search for a replenishment/sales order with order number 298 using fields 741 and 743, and button 745 similar to the search performed in FIG. 7B (with the Order Type selected as "Replenishment Order"). Row 749 of table 748 indicates that 200 units of comp-B are to be supplied at the rate of $4 each.

Button 747 enables a user to manually allocate components for shipping using an appropriate interface (not shown). It may be appreciated that such manual allocation of components is provided along with the automatic allocation of components corresponding to (replenishment) sales orders raised by CPU 210 as described in detail above.

FIG. 7E provides an interface similar to FIG. 7B, in which a user may adjust the number of components actually consumed for manufacturing a single assembly type in MP 180 in an embodiment. Such adjustments may be necessary for various reasons such as to accommodate defects in the shipped components, imperfections in manufacturing processes which may not be able to accurately utilize all the received units of the components, etc.

Table 755 depicts the details of the components in response to a user performing a search using fields 751 and 752 and button 754, similar to the search performed in FIG. 7B. Rows 757 and 758 of table 755 respectively show the details of components Comp-B and Comp-C required for manufacturing assembly type OSA-A. A user may enter desired amounts (and reason) for each of components in the fields provided under the column Consumption.

Button 759 enables a user to save the information provided in table 755, causing CPU 210 to create new sales orders for shortages. It may be appreciated that the number of units of each components specified in FIG. 7E are also included during the calculation of the aggregate payable price.

Thus, the interfaces of FIGS. 7B-7E (referred to as a workbench) together facilitates a user (e.g. a member of the outsourcing organization) to monitor/manage the various subcontracting orders generated by the outsourcing organization, the corresponding component requirements for each of the subcontracting orders, and the (replenishment) sales orders raised corresponding to the component requirements. The workbench also enables the user to keep track of the automatic allocation of the components (by CPU 210) corresponding to each raised sales order and/or to manually provide such allocations.

Further, the workbench facilitates a user to adjust the number of components actually consumed by the external organization thereby enabling CPU 210 to raise sales orders according to the adjusted number of components. As such, the workbench provides a user a common interface for the management of purchase orders according to chargeable subcontracting model.

FIG. 7F depicts the item transactions at the manufacturing partner (external organization simulated by the outsourcing organization) site indicating that the components required for manufacturing an assembly type have been received in an embodiment. Rows 762 (and corresponding display area 766) and 764 respectively indicate that 200 units of Comp-B and 100 units of Comp-C have been received in the stores of the manufacturing partner.

A software component (not shown) in digital processing system 200 on successful shipment may create receipt at MP 180 of each of the components (step 340).

FIG. 7G depicts the AR invoices raised for the number of components shipped to MP 180 (step 345) in an embodiment. Rows 772 and 774 of table 771 indicate AR invoices (with invoice numbers 62 and 63) raised, which are shown to correspond to components Comp-B and Comp-C in FIG. 8D.

It may be noted that the raising of the AR invoices is consistent with the deemed payment of the external organization to the outsourcing organization according to the chargeable subcontracting model. As may be further appreciated, CPU 210 (upon execution of appropriate software instructions) automatically generates the AR invoices, for example, upon entry of the order (FIG. 7A) or upon indication that the shipment has been received (FIG. 7F).

Further processing in digital processing system 200 occurs on receipt of the ordered assembly types outsourced to the external organization. Accordingly, the description is continued illustrating the processing of the receipt of the ordered assembly types.

9. Processing Receipt Indication

FIGS. 8A-8F illustrates the manner in which a receipt indication (indicating that an ordered quantity of an assembly type has been received) is processed in an embodiment. Each Figure is described below in further detail.

FIG. 8A depicts the manner in which a user specifies receipt of the ordered quantity of an assembly type OSA-A (step 350) in an embodiment. Row 812 indicates the receipt of 100 units of OSA-A. Fields 813 and 815 indicate that the assembly type have been supplied by MP 180 in response to the purchase order number 6375 (at 712 of FIG. 7A).

In response to the receipt indication of FIG. 8A, CPU 210 may generate AP invoice indicating the deemed price to be paid for the received quantities of assembly type OSA-A.

FIG. 8B depicts AR invoices raised indicating the deemed price to be paid for the received quantity of an assembly type in an embodiment. Table 822 displays a list of AP invoices matching a search criterion (not shown). In particular row 824 specifies the AP invoice created corresponding to the receipt of assembly type OSA-A against the purchase order number 6375 (also shown in FIG. 8A).

Corresponding to row 824, display area 826 indicates the breakdown of the price to be paid with the total amount indicated to be $1900 (field 827). Further, field 828 indicates that no amount has been paid and display area 829 indicates that the receipt/AP invoice was automatically created/raised.

FIGS. 8C-8F together illustrate the manner in which the net payable amount is calculated based on the aggregate payable price and the aggregate receivable price in one embodiment. Each of the Figures is described below in further detail.

In FIG. 8C, the details of the AR invoices raised for the number of components shipped to MP 180 is displayed. Rows 837 and rows 838 of table 836 indicate respectively the AR invoices for components Comp-B and Comp-C, and correspond to rows 772 and 774 of FIG. 7G. It may be noted that the Transaction Amounts corresponding to components Comp-B and Comp-C are shown to be $800 (200 units @$4/unit) and $600 (100 unit @$6/unit) respectively. The total amount is indicated to be $1400 as shown in display area 832.

Similarly, in FIG. 8D, the details of the AP invoice raised for the received quantity of assembly type is displayed similar to FIG. 8B. In particular, row 847 in table 846 indicates that $1900 (100 units @$19/unit) is the deemed payment for the received quantity of assembly type (OSA-A).

It may be appreciated that the price of $1400 (sum of the prices of the components shipped to the manufacturing partner) represents the aggregate receivable price, and the price of $1900 (the price of the desired/ordered quantity of the assembly type received from the manufacturing partner) represents the aggregate payable price.

Thus, on a user clicking/selecting button 849, CPU 210 computes a net payable amount as a difference of the aggregate payable price and the aggregate receivable price.

FIG. 8E is similar to FIG. 8B and depicts the AP invoice after the computation of the net payable amount has been performed (step 370) in an embodiment. Row 854 depicts the details of an AP invoice similar to the invoice of row 824 in FIG. 8B. It may be noted that the amount paid (field 858) is shown as $1400 in contrast to $0 shown in field 828 of FIG. 8B consistent with the deemed payment for the components, according to the chargeable subcontracting model.

FIG. 8F depicts the net payable amount that is to be paid by an outsourcing organization to an external organization for manufacturing a desired quantity of an assembly type. In particular, row 864 depicts the details of an AP invoice similar to the invoice of row 824 in FIG. 8B. Correspondingly, display area 867 indicates that the amount remaining to be paid is $500 ($1900-$1400) and display area 868 indicates that the invoice amount (aggregate payable price) is $1900 and the amount paid (the aggregate receivable price) is $1400.

From the user interfaces and displays of above, it may be appreciated that the task of the personnel/users in OEM organizations is substantially simplified in supporting chargeable subcontracting when outsourcing manufacturing of an assembled unit from multiple components.

It is further desirable that the information available in the above process flow be used for planning procurement of various components required as well. The manner in which the planning also can be simplified is described next.

10. Planning

FIG. 9 is a block diagram illustrating the manner in which the orders for components and assembly types can be planned in an embodiment of the present invention. The block diagram is shown containing three vertical partitions, with the first partition 911 identifying a planning stage, and second partition 912 and third partition 913 specifying respectively the manner in which the corresponding planning stage is performed in outsourcing/OEM organization and (simulated) external/MP organization. The block diagram is also shown with five horizontal partitions 951-955, each representing a planning stage.

In stage 951, the sourcing rules are specified for each of the organizations. The rules may be specified, for example, as described above with respect to 'Make or Buy' field in FIGS. 5D-5F. The sourcing rules for the components B and C, and the assembly type A, are set to buy for OEM, indicating that the components and assembly type are to be bought from another organization (MP 180 or RMS 140). Further, the supply source is also indicated as MP for assembly type A and RMS for components B and C.

Similarly, the sourcing rules for MP organization are also specified with components B and C indicated to be bought from OEM and assembly type as being 'Make' (i.e., the assembly type is manufactured at the MP organization site).

In stage 952, the forecast of the various items (components or assembly types) is determined. In particular, the user may indicate the number of units (by an appropriate user interface) of each item that need to be ordered in a future period of time. Alternatively, the number of units of each item may be determined based on forecast information based on prior historical data points. It may be observed that stage 952 depicts a forecast of 3 units of assembly type A as being required to be ordered in the near future.

In stage 953, the planning run determines the requirements for each item, specifically the components required for manufacturing the assembly types. Thus, in OEM organization, the net requirement of item A is sent as a demand to (simulated) MP organization as indicated by the dotted arrow. On the MP organization side, the item A is determined to be an assembly type and the various components required for manufacturing each item of A is calculated based on the BOM (FIG. 5G) of assembly type A.

Thus, the planning run on the MP organization is shown with components B and C, required for manufacturing assembly type A. Further the tree indicates that 2 units of B and 1 unit of C are required for manufacturing each unit of A consistent with the BOM. MP organization sends a demand for each of the components to OEM organization as represented by the dotted arrows in the reverse direction.

In stage 954, the planned orders for each of the items are generated. In the OEM organization, planned orders are generated for A, B and C, with all orders being of type BUY as indicated by the corresponding sourcing rules. Similarly, in the MP organization planned orders are generated for the items A, B and C with the order for A being of type Make, and the other orders being of type BUY.

In stage 955, physical purchase orders are generated corresponding to the planned orders of stage 954. The purchase orders are generated based on the value of release time fence field (FIGS. 5D-5F). It may be observed that for OEM organization, the value of release time fence for the items A, B and C was set to blank (no value) indicating that the orders are to be generated immediately. On the other hand, for MP organization, the value was set to 'Do Not Release' indicating that the orders are never to be generated (since the items B and C are sent by OEM organization).

As such, the OEM organization is shown with three purchase orders corresponding to the three planned orders for items A, B and C, with the purchase order for A indicating that the items are to be bought from MP organization, while the purchase orders of B and C indicate that the corresponding items are to be bought from RMS. These purchase orders are generated based on the supply source specified in the sourcing rules stage 951. Further, no jobs are generated for MP organization.

Thus, the purchase order of A represents an order indication similar to the indications provided by the user using interface of FIG. 7A. CPU 210, upon receiving such an order indication, may perform the further steps 325-380 of FIG. 3.

It may accordingly be appreciated that digital processing system 200, upon execution of appropriate software instructions, provides the various features described above with respect to FIGS. 5A-9. The description is continued with respect to a flow diagram, which summarizes the operation of digital processing system 200 in one embodiment.

11. Flow Diagram

FIG. 10 is a flow diagram summarizing the operation of digital processing system 200 in one embodiment. Again, the flow diagram is shown having two vertical partitions 1010 and 1020, respectively representing the operations associated with OEM 110 (outsourcing organization) and MP 180 (external organization). Each block/flow of FIG. 10 is described in detail below assuming a scenario in which 100 units of assembly type A is to be manufactured.

Block 1030 represents a subcontracting order (a purchase order as per chargeable subcontracting model) for 100 units of assembly type A. Such an order may be created by a user using the interface of FIG. 7A or alternatively generated on receiving a planned order (shown in stage 954 of FIG. 9) via path 1015.

Block 1040 represents a discrete job created in MP organization, which keeps track of the assembly units supplied in response to a subcontracting order. Block 1040 is generated along with block 1030 as indicated by flow 1034.

Blocks 1050 and 1055 represent replenishment purchase orders (PO) for components B and C. These blocks may be generated in MP 180 based on discrete job 1040 and BOM corresponding to assembly type A (flow 1045). Such replenishment POs are created only for simulating the actions performed at the external organization and are not invoiced (i.e., no AP invoices are generated based on the replenishment POs).

Blocks 1060 and 1065 represent replenishment sales orders (SO) generated for components B and C in response to the generation of blocks 1050 and 1055 representing corresponding replenishment purchase orders (flows 952 and 954). Thus the sales orders of the components are generated automatically on creation of the subcontracting order (block 1030). The details of one such sales order is shown in FIG. 7E.

Block 1060 is shown juxtaposed with a ship flag, which indicates whether the number of components of the sales order has been shipped. Similarly, the receive flag juxtaposed with block 1050 indicates whether the shipped components have been received at MP 180. The two flags are linked by flow 957, indicating the sequence of operations. Similarly block 1065 and 1055 are also shown with corresponding ship and receive flags connected by flow 1059.

Block 1070 represents an accounts receivable (AR) invoice generated corresponding to the sales orders of the components shipped (flows 1062 and 1067). The AR invoice may be generated automatically based on the status of the ship flags associated with the sales orders.

It may be noted that block 1030 is juxtaposed with a receive flag, which indicates whether the ordered quantity of assembly type has been received. The receive flag is shown connected to a complete flag juxtaposed with flag 1040, which indicates whether the discrete job has been completed.

On successful completion, a miscellaneous issue (block 1090) to the inventory of assembly type A may be generated (flow 1048). When multiple discrete jobs are being supported, this block ensures that the number of units of assembly type available for satisfying subcontracting orders is properly maintained.

Block 1075 represents an accounts payable (AP) invoice generated corresponding to the subcontracting order shown in block 1030 (flow 1032). The AP invoice may be generated automatically (again, implying, in response to execution of software instructions and various other status) based on the status of the receive flag of block 1030.

Block 1080 represents an AP/AR netting indicating a net payable amount calculated based on the AR and AP invoices. The OEM organization may then make arrangements for payment of the net payable amount to MP 180 (flow 1085).

It may be appreciated that the features of the present invention are described above with respect to an assembly type manufactured from two components merely for illustration. However the approaches can be extended in the context of more complex assembly types (requiring more than two components or other assembly types) and also to multiple external organizations, without departing from the scope and spirit of the present invention, as will be apparent to one skilled in the relevant arts.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A machine readable medium storing one or more sequences of instructions for causing a digital processing system to support an outsourcing organization in managing orders according to a chargeable subcontracting model when outsourcing manufacturing of assembled units while supplying at least some of the components to an external organization, wherein execution of said one or more sequences of instructions by one or more processors contained in said digital processing system causes said digital processing system to perform the actions of:

maintaining a component information specifying a plurality of assembly types and a plurality of components, said information also specifying a set of components and a count of each of the set of components required to manufacture a specified number of said plurality of assembly types;

receiving an order indication that a desired quantity of a first assembly type is to be ordered from said external organization according to said chargeable subcontracting model;

examining said component information to determine a first set of components and a corresponding count of each of said first set of components required for manufacturing each unit of said first assembly type;

computing a corresponding number of each of said first set of components required for manufacturing said desired quantity of said first assembly unit;

raising in said digital processing system supporting said outsourcing organization, a sales order as originating from said external organization for the corresponding number of each of the first set of components required for manufacturing said desired quantity of said first assembly type, wherein said outsourcing organization ships said corresponding number of each of said first set of components to said external organization against said sales order, wherein said sales order is raised in response to receiving of said order indication and before shipment of said first set of components, wherein said raising causes creation of data representing said sales order and saving the data in a secondary storage;

receiving a status indication indicating that said corresponding number of each of said first set of components have been shipped to said external organization against said sales order, thereby tracking a specific number of components shipped for manufacturing of said first assembly type according to the chargeable sub-contracting model;

raising in said digital processing system in response to said status indication, an accounts receivable invoice indicating that an aggregate receivable price of said corresponding number of said first set of components is to be received from said external organization;

receiving a receipt indication indicating that said desired quantity of said first assembly type has been received from said external organization at said outsourcing organization;

raising an accounts payable invoice indicating that an aggregate payable price for said desired quantity is to be paid to said external organization; and calculating a net payable amount to be paid by said outsourcing organization as equaling a difference of said aggregate payable price and said aggregate receivable price.

2. The machine readable medium of claim 1, further comprising one or more instructions enabling said user to perform the actions of:

creating said outsourcing and said external organization as inventory organizations, which are capable of keeping track of corresponding items;

assigning a supplier role to said external organization indicating that said external organization supplies said first assembly type, and a supplier and a customer role respectively to said outsourcing organization and said external organization indicating that said outsourcing organization supplies said first set of components to said external organization, wherein said raising said sales order is performed in response to receiving said order indication based on said assigning.

3. The machine readable medium of claim 2, further comprising one or more instructions enabling said user to perform the action of:

defining price related information associated with each of said plurality of assembly types and with each of said plurality of components, wherein said aggregate receivable price and said aggregate payable price are calculated based on said price related information.

4. The machine readable medium of claim 3, further comprising one or more instructions enabling said user to perform the actions of:

creating an order type for orders which are according to chargeable subcontracting model;

input a purchase order of said order type specifying that said desired quantity of said first assembly type is to be ordered from said external organization, wherein said order indication is received in response to said input, wherein said user performs the action of said input in response to receiving an order for said desired quantity of said first assembly type from a buyer organization.

5. The machine readable medium of claim 1, further comprising one or more instructions for:

specifying a plurality of sourcing rules including a first rule and a second rule for said outsourcing organization, and a third rule and a fourth rule for said external organization, wherein said first rule indicates that said first assembly type is to be purchased from said external organization, and said second rule indicates that a first component contained in said first set of components is to be purchased from a raw material supplier, wherein said third rule indicates that said first assembly is to be made in said external organization and said fourth rule indicates that said first component is to be purchased from said outsourcing organization according to chargeable subcontracting model.

6. The machine readable medium of claim 5, further comprising one or more instructions for:

receiving a forecasted quantity of said first assembly type in a future period;

planning a plurality of orders including a first order and a second order as originating from said outsourcing organization, and a third order as originating from said external organization, wherein said first order indicates that said forecasted quantity of said first assembly type is to be purchased from said external organization based on said first rule, wherein said second order indicates that a forecasted number of said first component required for manufacturing said forecasted quantity is to be purchased from said raw material supplier based on said second rule, and wherein said third order indicates that said forecasted number of said first component is to be purchased from said outsourcing organization based on said fourth rule.

7. The machine readable medium of claim 6, further comprising one or more instructions for:

receiving a release time indication indicating that said first order and said second order are to be released immediately, and said third order is not to be released; and releasing a first purchase order and a second purchase order corresponding to said first order and second order only, and not generating any purchase orders for said third order, wherein said releasing of first purchase order constitutes said order indication.

8. The machine readable medium of claim 1, further comprising one or more instructions for simulating a first set of actions performed in said external organization, wherein said first set of actions comprises:

generating a discrete job for said desired quantity of said first assembly type in response to said receiving of said order indication, wherein said discrete job enables said external organization to track status of inventory status of said first assembly type corresponding to said order indication.

9. The machine readable medium of claim 8, wherein said first set of actions further comprises:

generating a replenishment purchase order for a corresponding number of each of said first set of components required for manufacturing said desired quantity of said first assembly type, wherein said replenishment purchase order is generated as originating from said external organization, wherein said raising said sales order is done in response to said generating said replenishment purchase order.

10. The machine readable medium of claim 1, further comprising one or more instructions for:

allocating at said outsourcing organization said corresponding number of each of said first set of components as indicated by corresponding sales order, wherein said outsourcing organization ships said corresponding number of each of said first set of components to said external organization against corresponding sales order after said allocating.

11. The machine readable medium of claim 1, further comprising one or more instructions for:

receiving a changed order indication indicating that said desired quantity of said first assembly type has been modified to a new desired quantity;

identifying that said new desired quantity requires a corresponding number of said first set of components greater than that required for said desired quantity; and raising a second sales order as originating from said external organization for a corresponding difference in number of each of said first set of components required for manufacturing said new desired quantity of said first assembly type compared to manufacturing said desired quantity, wherein said outsourcing organization ships said difference in number of each of said first set of components to said external organization against said second sales order, wherein said aggregate payable price is calculated based on said new desired quantity instead of said desired quantity of said first assembly type.

12. The machine readable medium of claim 11, further comprising one or more instructions for:

receiving an adjustment indication indicating that a corresponding number of a first component contained in said first set of components is to be modified to an adjusted number of said first component;

identifying that said adjusted number of said first component is greater than said corresponding number of said first component; and raising a third sales order corresponding to a difference in number between said adjusted number and said corresponding number of said first component, wherein said outsourcing organization ships said difference of said first component to said external organization against said second sales order, wherein said aggregate receivable price is calculated based on said adjusted number instead of said corresponding number of said first component.

13. A computer implemented method of supporting an outsourcing organization in managing orders according to a chargeable subcontracting model when outsourcing manufacturing of assembled units while supplying at least some of the components to an external organization, said method being performed in a digital processing system, said method comprising:

maintaining a component information specifying a plurality of assembly types and a plurality of components, said information also specifying a set of components and a count of each of the set of components required to manufacture each of said plurality of assembly types;

receiving an order indication that a desired quantity of a first assembly type is to be ordered from said external organization according to the chargeable subcontracting model;

examining said component information to determine a first set of components and a corresponding count of each of said first set of components required for manufacturing each unit of said first assembly type;

computing a corresponding number of each of said first set of components required for manufacturing said desired quantity of said first assembly unit;

raising in said digital processing system supporting said outsourcing organization, a sales order as originating from said external organization for said corresponding number of each of said first set of components, wherein said sales order is raised in response to receiving of said order indication and before shipment of said first set of components, wherein said raising causes creation of data representing said sales order and saving the data in a secondary storage;

receiving a status indication indicating that said corresponding number of each of said first set of components have been shipped to said external organization against said sales order, thereby tracking a specific number of components shipped for manufacturing of said first assembly type according to the chargeable sub-contracting model;

raising in said digital processing system in response to said status indication, an accounts receivable invoice indicating that an aggregate receivable price of said corresponding number of said first set of components is to be received from said external organization;

receiving a receipt indication indicating that said desired quantity of said first assembly type has been received from said external organization at said outsourcing organization;

raising an accounts payable invoice indicating that an aggregate payable price for said desired quantity is to be paid to said external organization; and calculating a net payable amount as equaling a difference of said aggregate payable price and said aggregate receivable price.

14. A computer implemented method for supporting an outsourcing organization in managing orders according to a chargeable subcontracting model when outsourcing manufacturing of assembled units while supplying at least some of the components to an external organization, said method being performed in a digital processing system, said method comprising:

maintaining a component information specifying a plurality of assembly types and a plurality of components, said information also specifying a set of components and a count of each of the set of components required to manufacture a specified number of said plurality of assembly types;

receiving an order indication that a desired quantity of a first assembly type is to be ordered from said external organization according to the chargeable subcontracting model;

examining said component information to determine a first set of components and a corresponding count of each of said first set of components required for manufacturing each unit of said first assembly type;

computing a corresponding number of each of said first set of components required for manufacturing said desired quantity of said first assembly unit;

raising in said digital processing system supporting said outsourcing organization, a sales order as originating from said external organization for the corresponding number of each of the first set of components required for manufacturing said desired quantity of said first assembly type, wherein said outsourcing organization ships said corresponding number of each of said first set of components to said external organization against said sales order, wherein said sales order is raised in response to receiving of said order indication and before shipment of said first set of components, wherein said raising causes creation of data representing said sales order and saving the data in a secondary storage;

receiving a status indication indicating that said corresponding number of each of said first set of components have been shipped to said external organization against said sales order, thereby tracking a specific number of components shipped for manufacturing of said first assembly type according to the chargeable sub-contracting model;

raising in said digital processing system in response to said status indication, an accounts receivable invoice indicating that an aggregate receivable price of said corresponding number of said first set of components is to be received from said external organization;

receiving a receipt indication indicating that said desired quantity of said first assembly type has been received from said external organization at said outsourcing organization; and raising an accounts payable invoice indicating that an aggregate payable price for said desired quantity is to be paid to said external organization;

calculating a net payable amount to be paid by said outsourcing organization as equaling a difference of said aggregate payable price and said aggregate receivable price.

15. The method of claim 14, further comprising:

creating said outsourcing and said external organization as inventory organizations, which are capable of keeping track of corresponding items;

assigning a supplier role to said external organization indicating that said external organization supplies said first assembly type, and a supplier and a customer role respectively to said outsourcing organization and said external organization indicating that said outsourcing organization supplies said first set of components to said external organization, wherein said raising said sales order is performed in response to receiving said order indication based on said assigning.

16. The method of claim 14, further comprising simulating a first set of actions performed in said external organization, wherein said first set of actions comprises:

generating a discrete job for said desired quantity of said first assembly type in response to said receiving of said order indication, wherein said discrete job enables said external organization to track status of inventory status of said first assembly type corresponding to said order indication.

17. The method of claim 16, wherein said first set of actions further comprises:

generating a replenishment purchase order for a corresponding number of each of said first set of components required for manufacturing said desired quantity of said first assembly type, wherein said replenishment purchase order is generated as originating from said external organization, wherein said raising said sales order is done in response to said generating said replenishment purchase order.

18. The method of claim 14, further comprising:

allocating at said outsourcing organization said corresponding number of each of said first set of components as indicated by corresponding sales order, wherein said outsourcing organization ships said corresponding number of each of said first set of components to said external organization against corresponding sales order after said allocating.

19. The method of claim 14, further comprising:

receiving a changed order indication indicating that said desired quantity of said first assembly type has been modified to a new desired quantity;

identifying that said new desired quantity requires a corresponding number of said first set of components greater than that required for said desired quantity; and raising a second sales order as originating from said external organization for a corresponding difference in number of each of said first set of components required for manufacturing said new desired quantity of said first assembly type compared to manufacturing said desired quantity, wherein said outsourcing organization ships said difference in number of each of said first set of components to said external organization against said second sales order, wherein said aggregate payable price is calculated based on said new desired quantity instead of said desired quantity of said first assembly type.

20. The method of claim 19, further comprising:

receiving an adjustment indication indicating that a corresponding number of a first component contained in said first set of components is to be modified to an adjusted number of said first component;

identifying that said adjusted number of said first component is greater than said corresponding number of said first component; and raising a third sales order corresponding to a difference in number between said adjusted number and said corresponding number of said first component, wherein said outsourcing organization ships said difference of said first component to said external organization against said second sales order, wherein said aggregate receivable price is calculated based on said adjusted number instead of said corresponding number of said first component.

21. A digital processing system for supporting an outsourcing organization in managing orders according to a chargeable subcontracting model when outsourcing manufacturing of assembled units while supplying at least some of the components to an external organization, said digital processing system comprising:

means for maintaining a component information specifying a plurality of assembly types and a plurality of components, said information also specifying a set of components and a count of each of the set of components required to manufacture each of said plurality of assembly types;

means for receiving an order indication that a desired quantity of a first assembly type is to be ordered from said external organization according to the chargeable subcontracting model;

means for examining said component information to determine a first set of components and corresponding count of each of said first set of components required for manufacturing each unit of said first assembly type;

means for computing a corresponding number of each of said first set of components required for manufacturing said desired quantity of said first assembly unit;

means for raising in said digital processing system supporting said outsourcing organization, a sales order as originating from said external organization for said corresponding number of each of said first set of components, wherein said sales order is raised in response to receiving of said order indication and before shipment of said first set of components, wherein said raising causes creation of data representing said sales order and saving the data in a secondary storage;

means for receiving a status indication indicating that said corresponding number of each of said first set of components have been shipped to said external organization against said sales order, thereby tracking a specific number of components shipped for manufacturing of said first assembly type according to the chargeable subcontracting model;

means for raising in said digital processing system in response to said status indication, an accounts receivable invoice indicating that an aggregate receivable price of said corresponding number of said first set of components is to be received from said external organization;

means for receiving a receipt indication indicating that said desired quantity of said first assembly type has been received from said external organization at said outsourcing organization;

means for raising an accounts payable invoice indicating that an aggregate payable price for said desired quantity is to be paid to said external organization; and means for calculating a net payable amount as equaling a difference of said aggregate payable price and said aggregate receivable price.

* * * * *

UNITED STATES PATENT AND TRADEMARK OFFICE
CERTIFICATE OF CORRECTION

PATENT NO. : 7,908,187 B2
APPLICATION NO. : 11/861318
DATED : March 15, 2011
INVENTOR(S) : Reddy et al.

Page 1 of 1

It is certified that error appears in the above-identified patent and that said Letters Patent is hereby corrected as shown below:

In the drawings:
On sheet 3 of 32, in figure 3, in Box No. 335, line 1, delete "componets" and insert -- components --, therefor.

On sheet 3 of 32, in figure 3, in Box No. 360, line 2, delete "assembliy" and insert -- assembly --, therefor.

In column 8, line 7, delete "the the" and insert -- the --, therefor.

Signed and Sealed this
Eleventh Day of October, 2011

David J. Kappos
*Director of the United States Patent and Trademark Office*